US008750601B2

(12) United States Patent
Yamashita et al.

(10) Patent No.: US 8,750,601 B2
(45) Date of Patent: Jun. 10, 2014

(54) THREE-DIMENSIONAL IMAGE PROCESSING DEVICE, AND THREE-DIMENSIONAL IMAGE PROCESSING METHOD

(75) Inventors: Haruo Yamashita, Osaka (JP); Takeshi Ito, Osaka (JP); Hiromichi Ono, Hyogo (JP); Yasuhiro Kuwahara, Osaka (JP)

(73) Assignee: Panasonic Corporation, Osaka (JP)

( * ) Notice: Subject to any disclaimer, the term of this patent is extended or adjusted under 35 U.S.C. 154(b) by 144 days.

(21) Appl. No.: 13/636,338

(22) PCT Filed: Nov. 17, 2011

(86) PCT No.: PCT/JP2011/006406
§ 371 (c)(1),
(2), (4) Date: Sep. 21, 2012

(87) PCT Pub. No.: WO2012/098608
PCT Pub. Date: Jul. 26, 2012

(65) Prior Publication Data
US 2013/0011048 A1 Jan. 10, 2013

(30) Foreign Application Priority Data
Jan. 17, 2011 (JP) ................................. 2011-006912

(51) Int. Cl.
*G06K 9/00* (2006.01)
(52) U.S. Cl.
USPC ........................................ 382/154; 348/42.51
(58) Field of Classification Search
CPC ................................................. H04N 13/0022
USPC .................................. 382/154; 348/42, 47, 51
See application file for complete search history.

(56) References Cited

U.S. PATENT DOCUMENTS

| | | | |
|---|---|---|---|
| 6,031,564 A * | 2/2000 | Ma et al. | 348/43 |
| 7,167,304 B2 * | 1/2007 | Hanzawa | 359/377 |
| 7,679,641 B2 | 3/2010 | Lipton et al. | |
| 8,000,521 B2 | 8/2011 | Kira | |
| 8,345,956 B2 * | 1/2013 | Ward et al. | 382/154 |
| 8,384,763 B2 * | 2/2013 | Tam et al. | 348/43 |
| 8,471,898 B2 * | 6/2013 | Neuman | 348/51 |
| 2006/0158730 A1 | 7/2006 | Kira | |
| 2010/0165081 A1 | 7/2010 | Jung et al. | |

FOREIGN PATENT DOCUMENTS

| | | |
|---|---|---|
| EP | 2202992 A2 | 6/2010 |
| JP | H8-009421 A | 1/1996 |
| JP | 2002-232913 A | 8/2002 |
| JP | 2003-209858 A | 7/2003 |

(Continued)

*Primary Examiner* — Samir Ahmed
(74) *Attorney, Agent, or Firm* — Shinjyu Global IP

(57) ABSTRACT

In the three-dimensional imaging device (three-dimensional image processing device), the depth acquisition unit acquires L depth information and R depth information from a three-dimensional image. The image correction unit adjusts disparities of edge portion areas of a subject based on the L depth information and the R depth information such that the normal positions of the edge portion areas of the subject are farther away. Accordingly, when a three-dimensional image acquired by the three-dimensional imaging device is three-dimensionally displayed, the edge areas of the subject are displayed having a sense of roundness. As a result, a three-dimensional image that has been subjected to processing by this three-dimensional image processing device is a high-quality three-dimensional image that can appropriately reproduce the three-dimensional appearance and sense of thickness of the subject and has little of the cardboard effect.

7 Claims, 18 Drawing Sheets

(56) References Cited

FOREIGN PATENT DOCUMENTS

| | | | |
|---|---|---|---|
| JP | 2004-200973 A | 7/2004 |
| JP | 2004-320189 A | 11/2004 |
| JP | 2005-004341 A | 1/2005 |
| JP | 2006-042298 A | 2/2006 |
| JP | 2010-158009 A | 7/2010 |

* cited by examiner

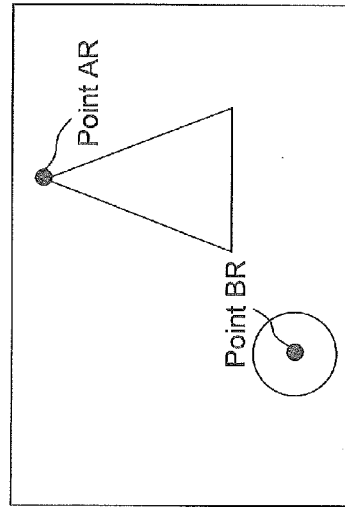
FIG. 4A
L image
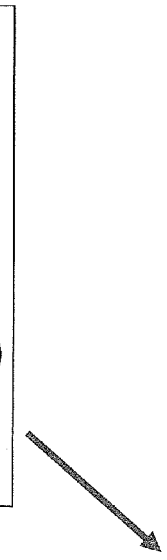
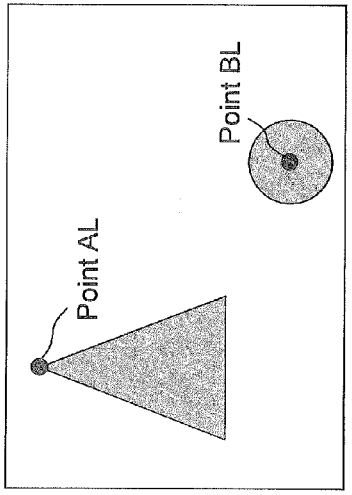
FIG. 4B
R image
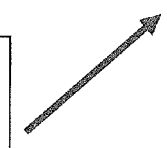
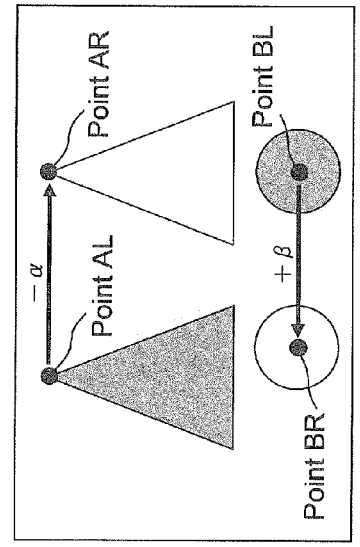
FIG. 4C

THREE-DIMENSIONAL IMAGE PROCESSING DEVICE, AND THREE-DIMENSIONAL IMAGE PROCESSING METHOD

FIELD OF THE INVENTION

The present invention relates to technology for raising the quality of three-dimensional images (three-dimensional images), and also relates to technology that is applicable to a wide range of devices that handle three-dimensional images (three-dimensional video), such as a camera (imaging device) that performs three-dimensional imaging, a display device that displays three-dimensional images (three-dimensional video), and an image processing device that processes three-dimensional images (three-dimensional video).

BACKGROUND

There are known to be three-dimensional imaging devices that capture three-dimensional images (left-eye images and right-eye images) in a state in which binocular disparity exists in order to reproduce three-dimensional images by displaying three-dimensional images (left-eye images and right-eye images) with a display device that can project images to the left and right eyes independently (hereinafter, referred to as a "three-dimensional display device").

In three-dimensional imaging, three-dimensional images (left-eye images and right-eye images) acquired in a state in which the distant view (subject in the distant view) and the near view (subject in the near view) have a high degree of disparity are images for which three-dimensional viewing is difficult since the fusion limit in human three-dimensional vision is exceeded, or are images that cause the person viewing them to feel fatigued (fatiguing images). In order to avoid the generation of such poor three-dimensional images, there is technology for obtaining favorable three-dimensional images by performing disparity adjustment and stereo base adjustment (hereinafter, referred to as "SB adjustment"), and such technology is widely used in professional three-dimensional imaging for movies and the like.

Disparity adjustment is mainly in the case where the distant view (subject in the distant view) exceeds the fusion limit. Performing disparity adjustment in order to non-linearly compress the distance to the distant view enables bringing the distant view (subject in the distant view) that was not easily viewable in three-dimensional viewing closer so as to acquire three-dimensional images that are easily viewable in three-dimensional viewing (easily stereoscopically viewable three-dimensional images).

Also, stereo base adjustment enables reducing the dynamic range of disparity by reducing the gap between two cameras (a camera for capturing left-eye images and a camera for capturing right-eye images) (by reducing the stereo base (interaxial distance)). For this reason, performing three-dimensional imaging after performing stereo base adjustment as described above enables acquiring three-dimensional images in which the entirety of the image from the near view (subject in the near view) to the distant view (subject in the distant view) falls within the fusion area.

Also, in the case of displaying three-dimensional images with a small-sized display device as well, the distant view is compressed since the disparity of the three-dimensional images (left-eye images and right-eye images) is reduced. Accordingly, in this case, the three-dimensional images displayed with the small-sized display device are easily viewable three-dimensional images.

In three-dimensional imaging, taking advantage of the above-described imaging technology (disparity adjustment and stereo base adjustment) enables capturing three-dimensional images that are sufficiently easily viewable images (easily stereoscopically viewable three-dimensional images) when three-dimensionally displayed in a predetermined display environment *

SUMMARY

Technical Problem

With the above-described conventional technology, easily viewable three-dimensional images (easily stereoscopically viewable three-dimensional images) are acquired by reducing desirable disparity (by reducing the disparity from the original value such that subjects serving as targets in three-dimensional imaging fall within the fusion area of three-dimensional vision) in consideration of the fusion limit of three-dimensional vision. Therefore such conventional technology is not desirable from the viewpoint of naturalness in three-dimensional appearance and sense of perspective in three-dimensional images. Accordingly, three-dimensional images acquired using the above-described conventional technology (technology using disparity adjustment and stereo base adjustment) have a problem related to three-dimensional image quality.

With technology using disparity adjustment, easily viewable (easily three-dimensionally viewable) three-dimensional images can be obtained, but since the distance to the distant view is non-linearly compressed, three-dimensional images that have been subjected to disparity adjustment are accompanied by a phenomenon in which the depth becomes flat (a phenomenon in which a subject in the distant view has a reduced appearance of thickness, and the three-dimensional image is perceived as a flat stereo-image).

Also, with technology using SB adjustment, the overall sense of perspective in acquired three-dimensional images is reduced (the distance from the nearest point to the most distant point is reduced), thus producing a phenomenon in which the three-dimensional appearance of individual subjects is reduced.

Accordingly, when using the above-described conventional technology, in both cases the acquired three-dimensional images tend to be low-quality images that are poor in three-dimensional appearance and sense of perspective.

Also, there are cases where the compression and reduction of three-dimensional appearance that occur when using the above-described conventional technology are accompanied by the so-called "cardboard effect".

The "cardboard effect" refers the phenomenon in which the thickness of an important subject such as a person in the foreground in a three-dimensional image is reduced, and the three-dimensional image appears to be a planar picture drawn on a board.

The quality of three-dimensional images drastically decreases if this cardboard effect occurs with important main subjects.

Also, the cardboard effect is not caused solely by the compression and reduction of three-dimensional appearance in a three-dimensional image due to performing disparity adjustment as in the above-described conventional technology. Depending on the imaging conditions (imaging situation), there are cases where the cardboard effect occurs even in ideal distortionless three-dimensional imaging (imaging for capturing three-dimensional images with no compression or reduction in three-dimensional appearance).

In this way, the cardboard effect is a visual phenomenon, and all of the factors that produce the cardboard effect have not been completely discovered. However, regardless of what factor produces the cardboard effect, it remains that the quality of three-dimensional images is impaired.

In light of the above-described problems, an object of the present invention is to realize a three-dimensional image processing device, a three-dimensional image processing method, and a program that, regardless of what factor produces the cardboard effect, restores the three-dimensional appearance and sense of thickness of a subject and obtains high-quality three-dimensional images with little of the cardboard effect.

Solution to Problem

A first aspect of the invention is a three-dimensional image processing device for performing image correction processing on a left-eye image and a right-eye image included in a twin-lens or multi-viewpoint three-dimensional image, the three-dimensional image processing device including a depth acquisition unit and an image correction unit.

The depth acquisition unit acquires distance information in a three-dimensional space with respect to a subject included in the left-eye image and the right-eye image.

(For example, the depth acquisition unit calculates distance information with respect to the subject included in the left-eye image and the right-eye image based on the left-eye image and the right-eye image, and acquires a left-eye distance image and a right-eye distance image.)

The image correction unit (1) detects an edge portion area of the subject in the left-eye image and/or the right-eye image based on the distance information on the subject acquired by the depth acquisition unit, and (2) adjusts a disparity of the detected edge portion area of the subject in the left-eye image and/or the right-eye image such that a normal position of the edge portion area of the subject is farther away when the three-dimensional image is three-dimensionally displayed.

According to this three-dimensional image processing device, the disparity of an edge portion area of the subject is adjusted such that the normal position of the edge portion area of the subject is farther away, and therefore the edge area of the subject is displayed having a sense of roundness when the three-dimensional image is three-dimensionally displayed. As a result, a three-dimensional image that has been subjected to processing by this three-dimensional image processing device is a high-quality three-dimensional image that can appropriately reproduce the three-dimensional appearance and sense of thickness of the subject and has little of the cardboard effect.

Note that "distance information in a three-dimensional space" refers to, when assuming for example that a left-eye image and a right-eye image are captured by three-dimensional imaging, the distance from a point (imaging point) in a three-dimensional space corresponding to a first viewpoint (e.g., the left-eye viewpoint when the left-eye image is acquired) or a second viewpoint (e.g., the right-eye viewpoint when the right-eye image is acquired) to a point in a three-dimensional space (imaging space when assuming that a right-eye image and a left-eye image are captured by three-dimensional imaging) corresponding to a first pixel that is a pixel in the left-eye image and a second pixel that is a pixel in the right-eye image corresponding to the first pixel.

Also, "distance information in a three-dimensional space with respect to a subject" (distance information serving as information regarding a distance of a subject) refers to information that is correlated with the subject distance.

Here, "subject distance" refers to the distance from an object in focus on the imaging element (e.g., CCD image sensor or CMOS image sensor) of the imaging unit to the camera (three-dimensional imaging device), and is a concept that includes the object point distance and the conjugate distance (object-image distance). Also, "subject distance" is a concept that includes the approximate distance from the three-dimensional imaging device to the subject, and is a concept that includes, for example, (1) the distance from the center-of-gravity position of the whole of the lenses (first viewpoint lens and/or second viewpoint lens) of the optical system of the three-dimensional imaging device to the subject, (2) the distance from the imaging element plane of the imaging element of the imaging unit to the subject, (3) the distance from the center of gravity (or center) of the three-dimensional imaging device to the subject, and (4) the distance from a line segment connecting the first viewpoint and the second viewpoint to the subject.

A second aspect of the invention is the first aspect of the invention, wherein the image correction unit includes a left-eye image correction unit and a right-eye image correction unit.

The left-eye image correction unit performs the following processing.

(1) The left-eye image correction unit detects, as left-eye distance change information, change in a distance between the subject and a background included in the left-eye image based on the distance information acquired by the depth acquisition unit, and detects a left edge portion area of the subject in the left-eye image using the left-eye distance change information.

(For example, differential processing is performed on the left-eye distance image, and the left edge portion area of the subject in the left-eye image is detected based on the image resulting from the differential processing and the left-eye distance image.)

(2) The left-eye image correction unit corrects the left-eye image such that the detected left edge portion area of the subject is enlarged in the leftward direction in the left-eye image.

The right-eye image correction unit performs the following processing.

(1) The right-eye image correction unit detects, as right-eye distance change information, change in a distance between the subject and the background included in the right-eye image based on the distance information acquired by the depth acquisition unit, and detects a right edge portion area of the subject in the right-eye image using the right-eye distance change information.

(For example, differential processing is performed on the right-eye distance image, and the right edge portion area of the subject in the right-eye image is detected based on the image resulting from the differential processing and the right-eye distance image.)

(2) The right-eye image correction unit corrects the right-eye image such that the detected right edge portion area of the subject is enlarged in the rightward direction in the right-eye image.

According to this three-dimensional image processing device, the left-eye image correction unit and the right-eye image correction unit can appropriately detect edge portion areas of the subject based on the depth value of the subject and the amount of change in the depth value (differential value). Furthermore, according to this three-dimensional image processing device, (1) the left edge portion area of the subject in the left-eye image can be enlarged in the leftward direction (stretched horizontally), and (2) the right edge portion area of the subject in the right-eye image can be enlarged in the rightward direction (stretched horizontally). As a result, in the three-dimensional image acquired by this three-dimensional image processing device, it is possible to add a very small amount of relative disparity such that edge portion areas of the subject curve backwards a little, without changing the disparity outside the edge portion areas of the subject. For this reason, when the three-dimensional image is displayed, edge areas of the subject are displayed having a sense of roundness. As a result, a three-dimensional image that has been subjected to processing by this three-dimensional image processing device is a high-quality three-dimensional image that can appropriately reproduce the three-dimensional appearance and sense of thickness of the subject and has little of the cardboard effect.

A third aspect of the invention is the first or second aspect of the invention, wherein the image correction unit includes a left-eye image correction unit and a right-eye image correction unit.

The left-eye image correction unit performs the following processing.

(1) The left-eye image correction unit detects, as left-eye distance change information, change in a distance between the subject and a background included in the left-eye image based on the distance information acquired by the depth acquisition unit, and detects a right edge portion area of the subject in the left-eye image using the left-eye distance change information.

(For example, differential processing is performed on the left-eye distance image, and the right edge portion area of the subject in the left-eye image is detected based on the image resulting from the differential processing and the left-eye distance image.)

(2) The left-eye image correction unit corrects the left-eye image such that the detected right edge portion area of the subject is shrunk in the leftward direction in the left-eye image.

The right-eye image correction unit performs the following processing.

(1) The right-eye image correction unit detects, as right-eye distance change information, change in a distance between the subject and the background included in the right-eye image based on the distance information acquired by the depth acquisition unit, and detects a left edge portion area of the subject in the right-eye image using the right-eye distance change information.

(For example, differential processing is performed on the right-eye distance image, and the right edge portion area of the subject in the right-eye image is detected based on the image resulting from the differential processing and the right-eye distance image.)

(2) The right-eye image correction unit corrects the right-eye image such that the detected left edge portion area of the subject is shrunk in the rightward direction in the right-eye image.

According to this three-dimensional image processing device, the left-eye image correction unit and the right-eye image correction unit can appropriately detect edge portion areas of the subject based on the depth value of the subject and the amount of change in the depth value (differential value). Furthermore, according to this three-dimensional image processing device, (1) the right edge portion area of the subject in the left-eye image can be shrunk in the leftward direction (compressed horizontally), and (2) the left edge portion area of the subject in the right-eye image can be shrunk in the rightward direction (compressed horizontally). As a result, in the three-dimensional image acquired by this three-dimensional image processing device, it is possible to add a very small amount of relative disparity such that edge portion areas of the subject curve backwards a little, without changing the disparity outside the edge portion areas of the subject. For this reason, when the three-dimensional image is displayed, edge areas of the subject (subject located in front of a virtual screen) are displayed having a sense of roundness. As a result, a three-dimensional image that has been subjected to processing by this three-dimensional image processing device is a high-quality three-dimensional image that can appropriately reproduce the three-dimensional appearance and sense of thickness of the subject and has little of the cardboard effect.

A fourth aspect of the invention is a three-dimensional image processing device for performing image correction processing on images P(1) to P(N) (a variable x in image P(x) being a natural number assigned in ascending order from left to right) that are N (N being a natural number greater than or equal to 2) images acquired by a multi-viewpoint system, the three-dimensional image processing device including a depth acquisition unit and an image correction unit.

The depth acquisition unit acquires distance information in a three-dimensional space with respect to a subject included in the image P(k) ($1 \le k \le N-1$, k being a natural number) and the image P(j+1) ($k \le j \le N-1$, j being a natural number).

The image correction unit (1) detects an edge portion area of the subject in the image P(k) and/or the image P(j+1) based on the distance information on the subject acquired by the depth acquisition unit, and (2) adjusts a disparity of the detected edge portion area of the subject in the image P(k) and/or the image P(j+1) such that a normal position of the edge portion area of the subject is farther away when the three-dimensional image is three-dimensionally displayed.

According to this three-dimensional image processing device, even in the case of N (N being a natural number greater than or equal to 2) images acquired by a multi-viewpoint system for three-dimensional viewing, the disparity of an edge portion area of the subject is adjusted such that the normal position of the edge portion area of the subject is farther away. Accordingly, when a three-dimensional image acquired by this three-dimensional image processing device is three-dimensionally displayed, the edge areas of the subject are displayed having a sense of roundness. As a result, a three-dimensional image that has been subjected to processing by this three-dimensional image processing device is a high-quality three-dimensional image that can appropriately reproduce the three-dimensional appearance and sense of thickness of the subject and has little of the cardboard effect.

A fifth aspect of the invention is the fourth aspect of the invention, wherein the image correction unit performs the following processing.

Specifically, the image correction unit detects a left edge portion area and a right edge portion area of the subject in the images P(1) to P(N), and in the image P(m) ($1 \le m \le N$, m being a natural number), letting $\Delta L(m)$ be a left-hand, with respect to the image, stretch amount of the detected subject, and $\Delta R(N-m+1)$ be a right-hand, with respect to the image, stretch amount of the detected subject, for any natural number x satisfying $1 \le x \le N-2$, using a right-hand stretch amount and a left-hand stretch amount that satisfy $$\Delta R(x) > \Delta R(x+1)$$

$$\Delta L(x) > \Delta L(x+1)$$

(1) for the image P(1), the image correction unit corrects the image P(1) such that the left edge portion area of the subject is enlarged in the leftward direction by the stretch amount ΔL(1), (2) for the image P(x) (2≤x≤N−1, x: natural number), the image correction unit corrects the image P(x) such that the left edge portion area of the subject is enlarged in the leftward direction by the stretch amount ΔL(x), and the right edge portion area of the subject is enlarged in the rightward direction by the stretch amount ΔR(N−x+1), and (3) for the image P(N), the image correction unit corrects the image P(N) such that the right edge portion area of the subject is enlarged in the rightward direction by the stretch amount ΔR(1).

According to this configuration, two images are extracted from the images P(1) to P(N), and letting the extracted images be the right-eye image and the left-eye image, the disparity of the target object existing in front of a virtual screen is lowered, that is to say, the disparity of the three-dimensional image changes toward a distance. For this reason, the vicinity of the contour (left edge portion area and right edge portion area) of the target object is slightly farther away than the interior (inner area in the image) of the target object. As a result, in the three-dimensional images after the processing, a sense of roundness is expressed such that the vicinity of the contour of the target object curves toward a distance.

Accordingly, this three-dimensional image processing device enables acquiring three-dimensional images in which the cardboard effect is reduced.

A sixth aspect of the invention is the fourth aspect of the invention, wherein the image correction unit performs the following processing.

Specifically, the image correction unit detects a left edge portion area and a right edge portion area of the subject in the images P(1) to P(N), and in the image P(m) (1≤m≤N, m being a natural number), letting ΔR(m) be a right-hand, with respect to the image, compression amount of the detected subject, and ΔL(N−m+1) be a left-hand, with respect to the image, compression amount of the detected subject, for any natural number x satisfying 1≤x≤N−2, using a right-hand compression amount and a left-hand compression amount that satisfy $$\Delta R(x) > \Delta R(x+1)$$

$$\Delta L(x) > \Delta L(x+1)$$

(1) for the image P(1), the image correction unit corrects the image P(1) such that the right edge portion area of the subject is shrunk in the rightward direction by the compression amount ΔR(1), (2) for the image P(x) (2≤x≤N−1, x: natural number), the image correction unit corrects the image P(x) such that the right edge portion area of the subject is shrunk in the rightward direction by the compression amount ΔR(x), and the left edge portion area of the subject is shrunk in the leftward direction by the compression amount ΔL(N−x+1), and (3) for the image P(N), the image correction unit corrects the image P(N) such that the left edge portion area of the subject is shrunk in the leftward direction by the compression amount ΔL(1).

According to this configuration, two images are extracted from the images P(1) to P(N), and letting the extracted images be the right-eye image and the left-eye image, the disparity of the target object existing in front of a virtual screen is lowered, that is to say, the disparity of the three-dimensional image changes toward a distance. For this reason, the vicinity of the contour (left edge portion area and right edge portion area) of the target object is slightly farther away than the interior (inner area in the image) of the target object. As a result, in the three-dimensional images after the processing, a sense of roundness is expressed such that the vicinity of the contour of the target object curves away.

Accordingly, this three-dimensional image processing device enables acquiring three-dimensional images in which the cardboard effect is reduced.

A seventh aspect of the invention is a three-dimensional image processing method for performing image correction processing on a left-eye image and a right-eye image included in a twin-lens or multi-viewpoint three-dimensional image, the three-dimensional image processing method including a depth acquisition step and an image correction step.

The depth acquisition step is a step of calculating, from the left-eye image and the right-eye image, distance information with respect to a subject included in the left-eye image and the right-eye image, and generating a left-eye distance image and a right-eye distance image.

The image correction step is a step of (1) detecting an edge portion area of the subject in the left-eye image and/or the right-eye image based on the distance information on the subject acquired in the depth acquisition step, and (2) adjusting a disparity of the detected edge portion area of the subject in the left-eye image and/or the right-eye image such that a normal position of the edge portion area of the subject is farther away when the three-dimensional image is three-dimensionally displayed.

This enables realizing a three-dimensional image processing method that has effects similar to those of the first aspect of the invention.

An eighth aspect of the invention is a program for causing a computer to execute a three-dimensional image processing method for performing image correction processing on a left-eye image and a right-eye image included in a twin-lens or multi-viewpoint three-dimensional image. The three-dimensional image processing method includes a depth acquisition step and an image correction step.

The depth acquisition step is a step of calculating, from the left-eye image and the right-eye image, distance information with respect to a subject included in the left-eye image and the right-eye image, and generating a left-eye distance image and a right-eye distance image.

The image correction step is a step of (1) detecting an edge portion area of the subject in the left-eye image and/or the right-eye image based on the distance information on the subject acquired in the depth acquisition step, and (2) adjusting a disparity of the detected edge portion area of the subject in the left-eye image and/or the right-eye image such that a normal position of the edge portion area of the subject is farther away when the three-dimensional image is three-dimensionally displayed.

This enables realizing a program for causing a computer to execute a three-dimensional image processing method that has effects similar to those of the first aspect of the invention.

Advantageous Effects

According to the present invention, regardless of what factor produces the cardboard effect, it is possible to restore the three-dimensional appearance and sense of thickness of a subject and obtain high-quality three-dimensional images with little of the cardboard effect.

BRIEF DESCRIPTION OF DRAWINGS

FIGS. 4A to 4C are diagrams for illustrating a method for generating first depth information (R depth information) and second depth information (L depth information) using disparity matching

DETAILED DESCRIPTION

The following describes embodiments of the present invention with reference to the drawings. It will be apparent to those skilled in the art from this disclosure that the following descriptions of the embodiments are provided for illustration only and not for the purpose of limiting the invention as defined by the appended claims and their equivalents.

First Embodiment

The first embodiment is described below taking the example of a twin-lens three-dimensional imaging device (digital camera, video camera, or the like) as a three-dimensional image processing device.

<1.1: Configuration of Three-Dimensional Imaging Device>

Figure 1:
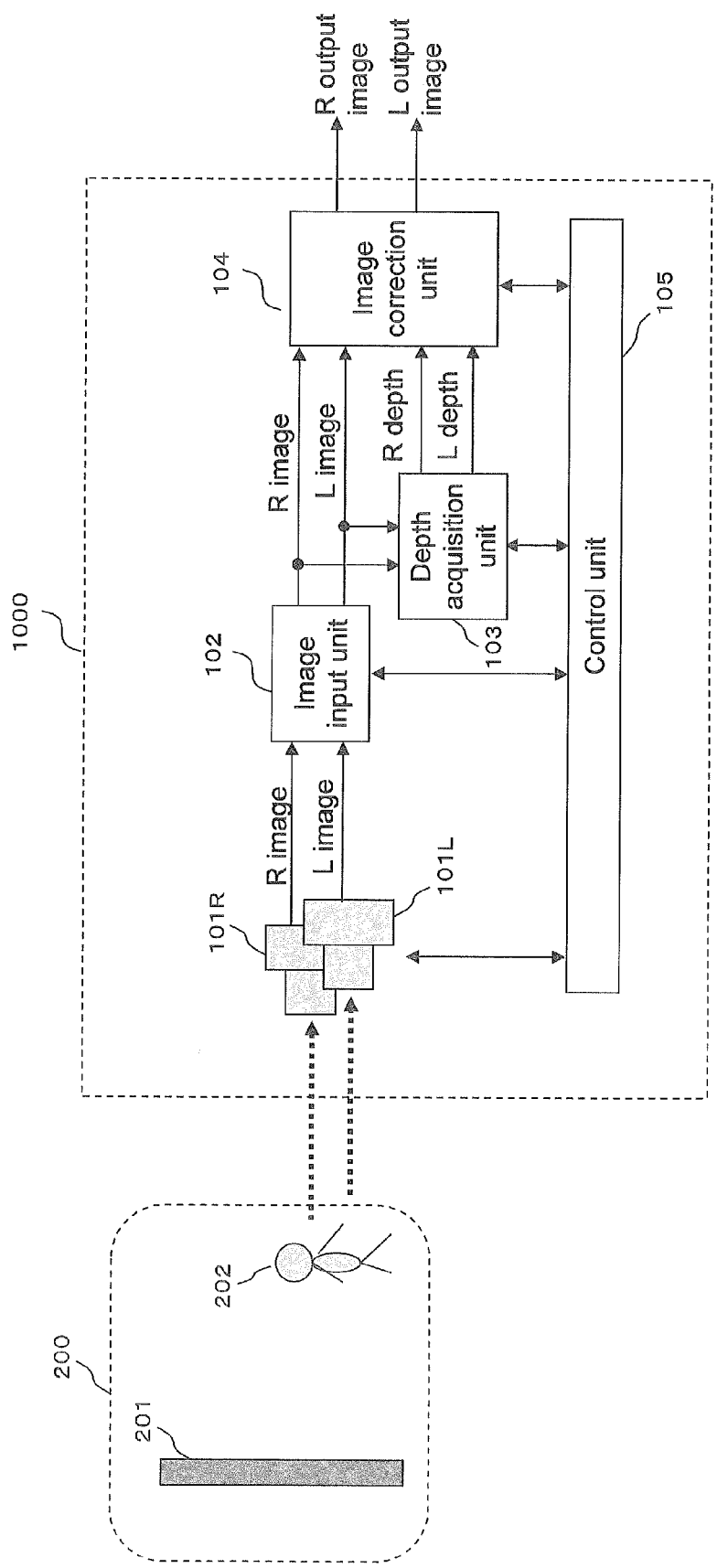
FIG. 1 is a schematic configuration diagram of a three-dimensional imaging device 1000 according to a first embodiment including an imaging environment (imaging scene).

FIG. 1 shows a schematic diagram of a three-dimensional imaging device 1000 according to the first embodiment. Note that in addition to the three-dimensional imaging device 1000, FIG. 1 also schematically shows a scene 200 (imaging scene 200) that is captured by the three-dimensional imaging device 1000.

As shown in FIG. 1, the three-dimensional imaging device 1000 includes a first imaging unit 101R that collects subject light from a first viewpoint and acquires a first image signal (e.g., a right-eye image signal (R image signal)), a second imaging unit 101L that collects subject light from a second viewpoint and acquires a second image signal (e.g., a left-eye image signal (L image signal)), and an image input unit 102 that converts the first image signal (e.g., R image signal) and the second image signal (e.g., L image signal) into digital signals.

The three-dimensional imaging device 1000 also includes a depth acquisition unit that calculates subject distance information from the first image signal (e.g., R image signal) and the second image signal (e.g., L image signal) that were converted into digital signals and outputs the subject distance information as first depth information (e.g., R depth information) and second depth information (e.g., L depth information), and an image correction unit 104 that performs image correction processing on the first image signal (e.g., R image signal) and the second image signal (e.g., L image signal) using the first depth information (e.g., R depth information) and the second depth information (e.g., L depth information).

Also, as shown in FIG. 1, the three-dimensional imaging device 1000 includes a control unit 105 that controls the above-described function units. Note that the control unit 105 and the function units of the three-dimensional imaging device 1000 may be directly connected to each other, or may be connected to each other via a bus.

Note that for the sake of convenience in the description, the following describes the case where right-eye images (video) are captured by the first imaging unit 101R, and left-eye images (video) are captured by the second imaging unit 101L.

The first imaging unit 101R is disposed at a first viewpoint and includes an optical system that collects subject light and an imaging element that acquires a first image signal (right-eye image signal (R image signal)) from the collected subject light through photoelectric conversion. The first imaging unit 101R then outputs the acquired first image signal (R image signal) to the image input unit 102.

The second imaging unit 101L is disposed at a second viewpoint that is at a different position from the first viewpoint, and includes an optical system that collects subject light and an imaging element that acquires a second image signal (left-eye image signal (L image signal)) from the collected subject light through photoelectric conversion. The second imaging unit 101L then outputs the acquired second image signal (L image signal) to the image input unit 102.

The image input unit 102 receives an input of the first image signal (R image signal) acquired by the first imaging unit 101R, performs A/D conversion on the input first image signal, and outputs the first image signal (R image signal) resulting from the A/D conversion to a depth acquisition unit 103 and an image correction unit 104.

The image input unit 102 also receives an input of the second image signal (L image signal) acquired by the second imaging unit 101L, performs A/D conversion on the input second image signal, and outputs the second image signal (L image signal) resulting from the A/D conversion to the depth acquisition unit 103 and the image correction unit 104.

The depth acquisition unit 103 receives an input of the first image signal (R image signal) and the second image signal (L image signal) that were output from the image input unit 102. The depth acquisition unit 103 generates first depth information (R depth information), which is first image (R image) depth information, and second depth information (L depth information), which is second image (L image) depth information, from a first image (R image) formed by the first image signal (R image signal) and a second image (L image) formed by the second image signal (L image signal). The depth acquisition unit 103 then outputs the generated first depth information (R depth information) and second depth information (L depth information) to the image correction unit 104.

Note that it is preferable that the depth information is generated by disparity matching, for example.

Figure 2:
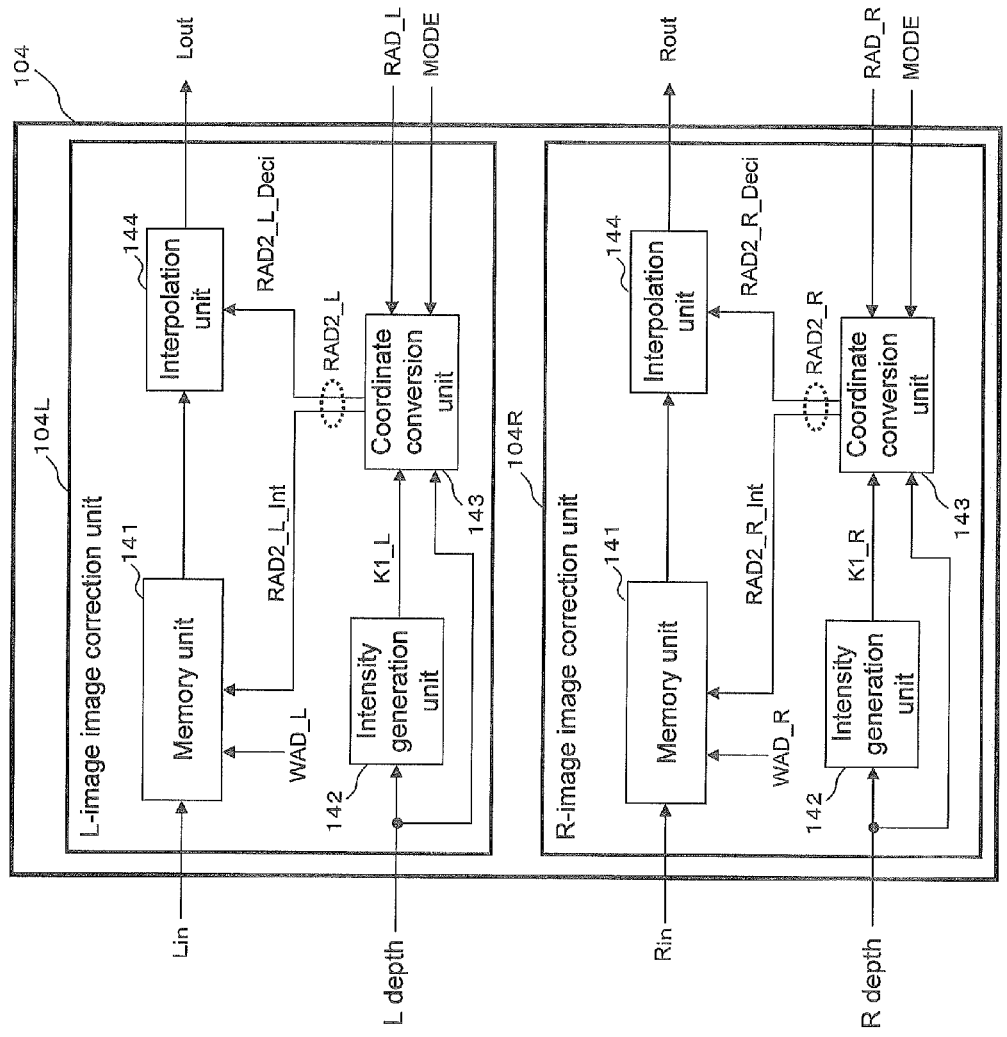
FIG. 2 is a configuration diagram of an image correction unit 104 according to the first embodiment.

As shown in FIG. 2, the image correction unit 104 includes an L-image image correction unit 104L and an R-image image correction unit 104R. The image correction unit 104 receives an input of the first image signal (R image signal) and the second image signal (L image signal) that are output from the image input unit 102, and the first depth information (R depth information) and the second depth information (L depth information) that are output from the depth acquisition unit 103. The image correction unit 104 performs correction processing on the first image signal (R image signal) based on the first depth information (R depth information), and outputs a first image signal (R image signal) resulting from the correction processing. The image correction unit 104 also performs correction processing on the second image signal (L image signal) based on the second depth information (L depth information), and outputs a second image signal (L image signal) resulting from the correction processing.

As shown in FIG. 2, the L-image image correction unit 104L includes a memory unit 141, an intensity generation unit 142, a coordinate conversion unit 143, and an interpolation unit 144.

As shown in FIG. 2, the memory unit 141 receives an input of an L image signal Lin that is output from the image input unit 102, a writing address WAD_L that is output from the control unit 105, and RAD2_L_Int, which is the integer portion of a readout address RAD2_L that is output from the coordinate conversion unit 143. The memory unit 141 writes the data (signal value) of the L image signal Lin to the address indicated by the writing address WAD_L at a predetermined timing. The memory unit 141 also reads out the data (signal value) of the L image signal Lin from the address indicated by the readout address (integer portion) RAD2_L_Int at a predetermined timing. The memory unit 141 then outputs the readout data (signal value) of the L image signal Lin to the interpolation unit 144.

A line memory, for example, can be used as the memory unit 141.

The intensity generation unit 142 receives an input of the second depth information (L depth information) that is output from the depth acquisition unit 103 and generates an intensity signal K1_L from the second depth information (L depth information). The intensity generation unit 142 then outputs the generated intensity signal K1_L to the coordinate conversion unit 143.

The coordinate conversion unit 143 receives an input of the intensity signal K1_L that is output from the intensity generation unit 142, the second depth information (L depth information) that is output from the depth acquisition unit 103, and the readout address RAD_L and a mode setting signal MODE that are output from the control unit 105. The mode setting signal MODE is a signal for setting the mode of the correction processing method performed by the image correction unit 104.

The following two modes are modes set by the mode setting signal MODE.

(1) A "stretching mode" in which the left edge side of a subject in an L image is stretched, and the right edge side of the subject in an R image is stretched.

(2) A "compressing mode" in which the right edge side of a subject in an L image is compressed, and the left edge side of the subject in an R image is compressed.

The coordinate conversion unit 143 converts the readout address RAD_L into a readout address RAD2_L based on the second depth information (L depth information) and the intensity signal K1_L such that processing ordered by the mode set by the mode setting signal MODE is executed. The coordinate conversion unit 143 then outputs an integer portion RAD2_L_Int of the converted readout address RAD2_L to the memory unit 141, and outputs a decimal portion RAD2_L_Deci of the converted readout address RAD2_L to the interpolation unit 144.

The interpolation unit 144 receives an input of the L image signal that is output from the memory unit 141 and the decimal portion RAD2_L_Deci of the readout address RAD2_L that is output from the coordinate conversion unit 143. The interpolation unit 144 then performs interpolation processing on the data (signal value) of the L image signal based on the readout address (decimal portion) RAD2_L_Deci (details of the interpolation processing will be described later). The interpolation unit 144 then outputs the L image signal resulting from the interpolation processing as an L image signal Lout.

The L-image image correction unit 104L is configured as described above.

Note that the R-image image correction unit 104R has a configuration similar to that of the L-image image correction unit 104L, and the input signals differ from those of the L-image image correction unit 104L only in that the R image signal and the R depth information are used.

As shown in FIG. 1, the control unit 105 is connected to the first imaging unit 101R, the second imaging unit 101L, the image input unit 102, the depth acquisition unit, and the image correction unit 104 such that necessary signals can be exchanged in both directions. The control unit 105 controls the above-described function units of the three-dimensional imaging device 1000 using predetermined control signals (drive signals, synchronization signals, and the like) such that signal processing is executed on the R image signal and the L image signal and data readout/writing processing is executed at predetermined timings.

<1.2: Operations of Three-Dimensional Imaging Device>

The following describes operations of the three-dimensional imaging device 1000 configured as described above.

For example, even if an improvement is made with respect to contour unnaturalness in three-dimensional viewing by emphasizing the shading inside a target object in a three-dimensional image, there are cases where the cardboard effect still remains (cases where the cardboard effect occurs). The cardboard effect that occurs in such cases is speculated to be due to high-level cognition mechanisms in the human brain, and the specific causes are not known. In the present embodiment, the cardboard effect is reduced by performing minute disparity adjustment with respect to a certain range in the vicinity of the left and right edges of a target object in a three-dimensional image so as to emphasize the sense of roundness of the target object to a greater sense than it actually is.

Note that in FIG. 1, the imaging scene 200 includes a background 201 and a foreground 202. The foreground 202 is the main subject. The following describes operations of the three-dimensional imaging device 1000 taking the example of the case where the three-dimensional imaging device 1000 performs three-dimensional imaging of an imaging scene such as that shown in FIG. 1 (the imaging scene shown in FIG. 3).

Figures 3A, 3B, 3C:
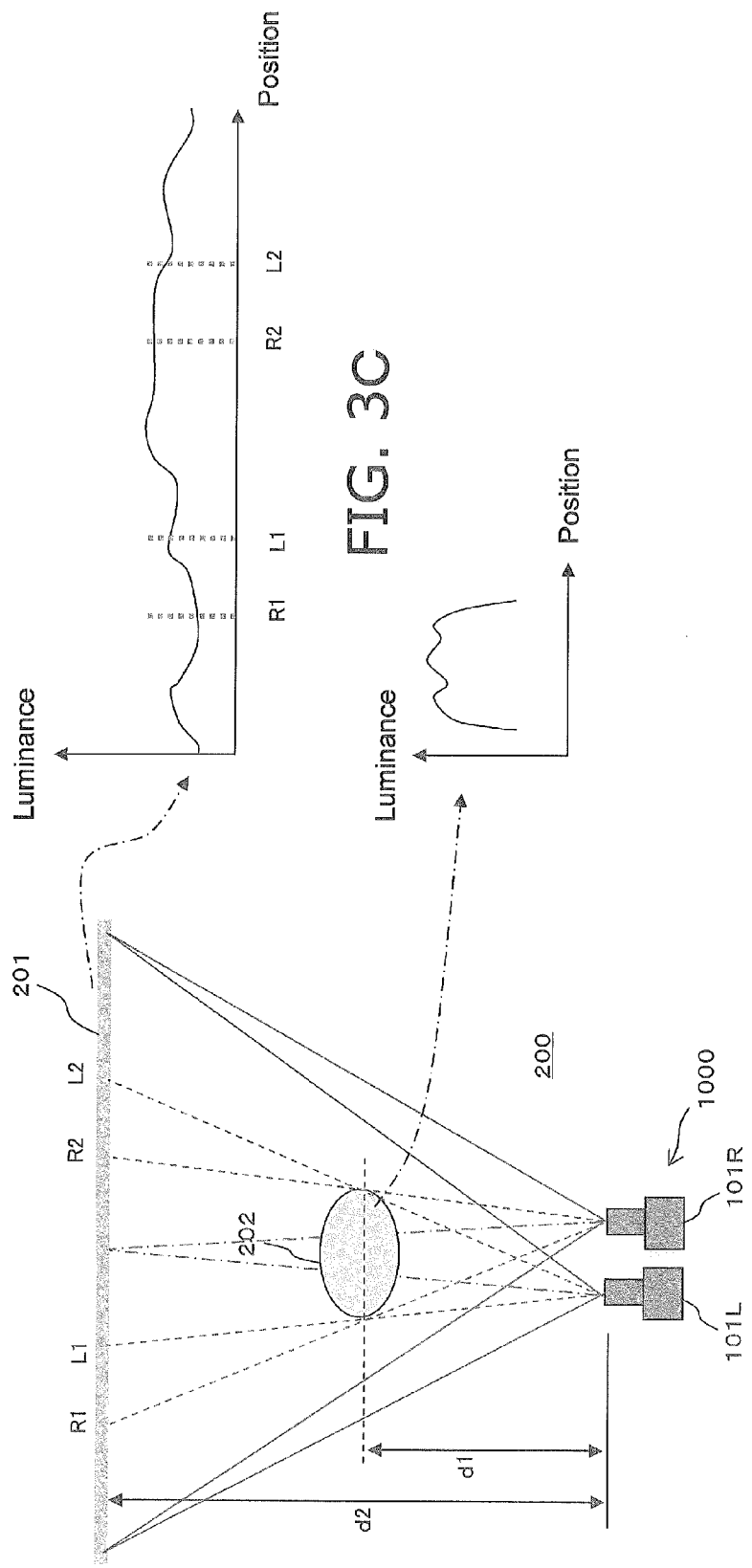
FIGS. 3A to 3C are illustrative diagrams for an imaging environment and a subject.

Also, FIG. 3 are diagrams of the imaging scene in FIG. 1 as viewed from above, and schematically shows the relationship (one example thereof) between the imaging environment and the subject in the case of performing three-dimensional imaging using the three-dimensional imaging device 1000. FIG. 3A shows the imaging environment (imaging scene) 200, the first imaging unit 101R and the second imaging unit 101L as viewed from above. In the imaging environment (imaging scene) 200, the foreground main subject 202 and the background subject 201 are in the positional relationship shown in FIG. 3A. Note that in order to simplify the description, the background subject 201 is a wall with a picture painted thereon or the like, but it goes without saying that there is no limitation to this subject, and another subject may be used.

FIG. 3B shows a luminance distribution of the picture painted on the background subject 201, and FIG. 3C shows a front luminance distribution of the foreground main subject 202 as viewed from the three-dimensional imaging device 1000 side (camera side).

Note that in FIGS. 3A and 3B, the horizontal axis indicates the position in the horizontal direction, and the vertical axis indicates the luminance.

Note that in order to simplify the description, the angle of convergence is set such that the center line of the angle of view imaged by the first imaging unit 101R of the three-dimensional imaging device 1000 (the dashed dotted line extending from 101R in FIG. 3) and the center line of the angle of view imaged by the second imaging unit 101L (the dashed dotted line extending from 101L in FIG. 3) intersect at a distance (d2) at which the background 201 is disposed.

Also, the foreground 202 (main subject 202) is assumed to be, for example, a three-dimensional object having roundness (e.g., a substantially elliptical object having a predetermined width when viewed from above (e.g., a person)).

Note that although the angle of convergence is set as described above for the sake of convenience in the description, there is no limitation to this, and the angle of convergence may be set to another angle.

Subject light from the imaging scene 200 is collected by the first imaging unit 101R disposed at the first viewpoint and converted into the first image signal (R image signal) by the imaging element of the first imaging unit 101R. Similarly, subject light from the imaging scene 200 is collected by the second imaging unit 101L disposed at the second viewpoint and converted into the second image signal (L image signal) by the imaging element of the second imaging unit 101L.

Note that the first imaging unit 101R and the second imaging unit 101L are disposed separated by an interaxial distance (stereo base length) such that the three-dimensional imaging device 1000 can acquire three-dimensional images (left-eye images and right-eye images).

The first image signal (R image signal) output from the first imaging unit 101R and the second image signal (L image signal) output from the second imaging unit 101L are both input to the image input unit 102 and converted into digital signals by the image input unit 102. The first image signal (R image signal) and the second image signal (L image signal) that were converted into digital signals are then both output to the depth acquisition unit 103 and the image correction unit 104.

The depth acquisition unit 103 generates, through disparity matching for example, first depth information (R depth information), which is first image (R image) depth information, and second depth information (L depth information), which is second image (L image) depth information, from a first image (R image) formed by the first image signal (R image signal) and a second image (L image) formed by the second image signal (L image signal).

The following describes the method for generating the first depth information (R depth information) and the second depth information (L depth information) through disparity matching with reference to FIG. 4.

FIG. 4 are diagrams schematically showing three-dimensional images when the three-dimensional imaging device 1000 performs three-dimensional imaging on an imaging scene in which a triangular object is disposed in the background and a circular object is disposed in the foreground. FIG. 4A schematically shows an L image (left-eye image), FIG. 4B schematically shows an R image (right-eye image), and FIG. 4C shows the case where the R image and the L image are displayed superimposed on each other to form one image.

The method for generating the first depth information (R depth information) and the second depth information (L depth information) through disparity matching is realized by executing the processing of (1) to (3) below, for example.

(1) First, the depth acquisition unit 103 detects, using the L image (left-eye image) and the R image (right-eye image), that a subject A (vertex of the triangle in FIG. 4) corresponding to a point AL in the L image in FIG. 4A corresponds to a point AR in the R image in FIG. 4B.

(2) The depth acquisition unit 103 then calculates a deviation amount (disparity) Diff(A) between the two detected points AL and AR.

Note that the disparity has a plus or minus sign depending on the direction of deviation. For example, if a point in the R image is deviated from a point in the L image in the leftward direction, the disparity is positive, and the disparity is negative in the opposite case.

For example, in the example in FIG. 4, letting the absolute value of disparity for the subject A be a ($\geq 0$), the point AR in the R image is deviated from the point AL in the L image in the rightward direction, and therefore the disparity for the subject A is calculated as "$-\alpha$". Letting the absolute value of disparity for the subject B (center point of the circle in FIG. 4) be $\beta$ ($\geq 0$), a point BR in the R image is deviated from a point BL in the L image in the leftward direction, and therefore the disparity for the subject B is calculated as "$+\beta$".

(3) The depth acquisition unit 103 performs the processing of (1) and (2) on all of the points (all of the pixels) in the images, and generates a disparity image whose pixel values are the calculated deviation amounts (disparities). Then the disparity image generated by using the disparities calculated for each pixel in the L image as pixel values is used as the L depth information (L depth information image (left-eye image distance image)), and the disparity image generated by using the disparities calculated for each pixel in the R image as pixel values is used as the R depth information (R depth information image (right-eye image distance image)).

For example, in the L depth information (L depth information image (left-eye image distance image)), the value of the pixel corresponding to the point AL in the L image in FIG. 4A becomes $-\alpha$, which is the disparity of the subject A, and in the R depth information (R depth information image (right-eye image distance image)), the value of the pixel corresponding to the point AR in the R image in FIG. 4B becomes −α, which is the disparity of the subject A.

Note that a "distance image" is an image in which the value mapped to each pixel is a value that is correlated with the distance between the actual position of the subject corresponding to the pixel (position in three-dimensional space) and the position of the three-dimensional imaging device 1000.

Note that the above-described method for generating the first depth information (R depth information) and the second depth information (L depth information) through disparity matching is one example, and there is no limitation to this. For example, the signs may be assigned to the disparities in the opposite manner. Also, the depth acquisition unit 103 may use another method in order to acquire the left-eye image distance image and the right-eye image distance image and acquire the L depth information and the R depth information.

The L depth information and the R depth information generated as described above are output to the image correction unit 104.

1.2.1: Operations of Image Correction Unit 104

The following describes operations of the image correction unit 104.

Note that the L-image image correction unit 104L executes processing on the L image using the L depth information, and the R-image image correction unit 104R executes processing on the R image using the R depth information, and since the content of such processing is the same, the following mainly describes operations of the L-image image correction unit 104L.

First, operations, of the intensity generation unit 142 of the L-image image correction unit 104L will be described.

Figure 5:
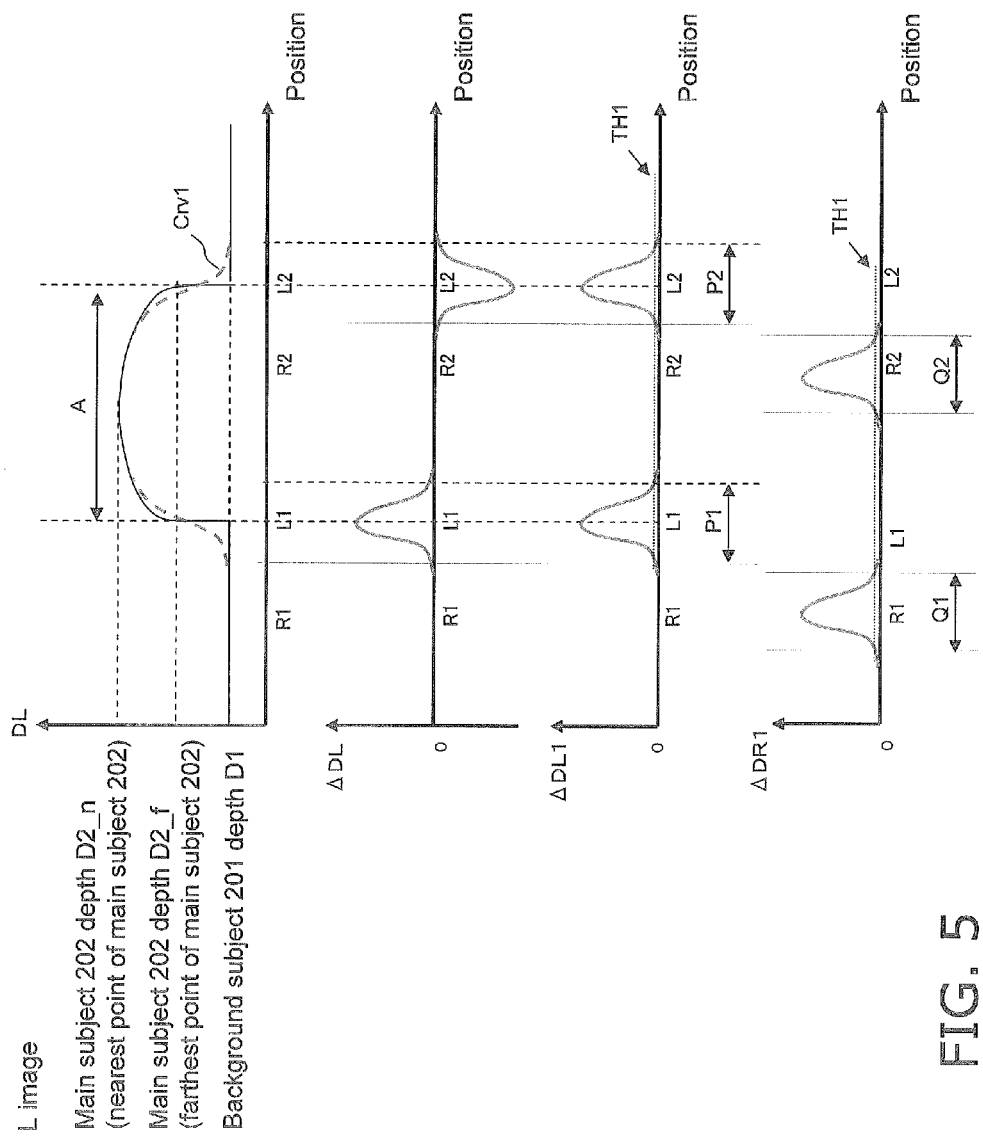
FIG. 5 is a signal waveform diagram of an intensity generation unit 142 according to the first embodiment.

FIG. 5 is a diagram for illustrating operations of the intensity generation unit 142. In the top diagram of FIG. 5, the horizontal axis indicates positions in the horizontal direction, and the vertical axis indicates the values of the L depth information. Specifically, DL in the top diagram of FIG. 5 is the L image depth information (distance information) with respect to pixel positions in the L image, and represents the L image depth information (distance information) obtained from the depth acquisition unit 103. Here, the value of DL is smaller the farther away the position is (the greater the subject distance is), and is larger the more the position is in the foreground (the smaller the subject distance is).

Accordingly, as shown in the top diagram of FIG. 5, the depth information (distance information) on the main subject 202 has greater values than the depth information (distance information) on the background subject 201. Also, as shown in the top diagram of FIG. 5, the values of the L depth information on the main subject 202 are values in the range of D2_f to D2_n. In other words, the value of the L depth information on the nearest point of the main subject 202 is D2_n, and the value of the L depth information on the farthest point of the main subject 202 is D2_f. Also, since the background subject 201 is a flat wall, all of the values of the L depth information on the background subject 201 are D1.

Figure 6:
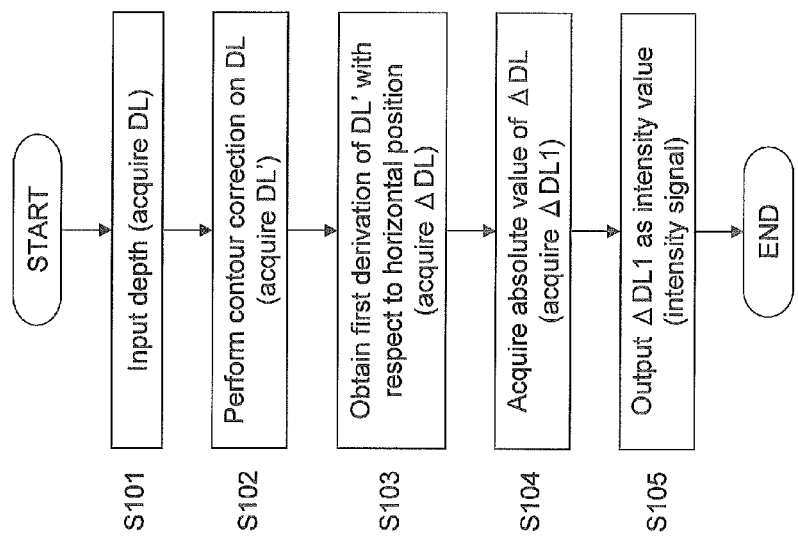
FIG. 6 is a flowchart of processing performed by the intensity generation unit according to the first embodiment.

The following describes operations of the intensity generation unit 142 with reference to FIG. 5 and the flowchart of FIG. 6.

(S101, S102):

The intensity generation unit 142 acquires contour correction L depth values DL' (which correspond to the curve Crv1 in FIG. 5) by performing contour correction processing (e.g., LPF processing) on the L depth information (L depth value) that was input.

(S103):

The intensity generation unit 142 acquires an L depth differential signal ΔDL by differentiating (finite differentiating) the contour correction L depth value DL' with respect to the horizontal position (value in the X axis direction in FIG. 5).

(S104):

The intensity generation unit 142 acquires an L depth differential absolute value signal ΔDL1 by obtaining the absolute value of the L depth differential signal ΔDL.

(S105):

The intensity generation unit 142 outputs the acquired L depth differential absolute value signal ΔDL1 to the coordinate conversion unit 143 as an L image intensity signal K1_L.

According to the above-described configuration, the three-dimensional imaging device 1000 can accurately detect a vicinity of the contour where the depth values are different using the L image intensity signal K1_L generated by the intensity generation unit 142.

The coordinate conversion unit 143 can detect a left edge portion area and a right edge portion area of the target object using the L image intensity signal K1_L generated by the intensity generation unit 142. For example, in FIG. 5, the coordinate conversion unit 143 detects areas P1 and P2 in which the value of the L image intensity signal K1_L is greater than or equal to a predetermined value (e.g., greater than or equal to a value TH1 indicated by the dotted line shown in FIG. 5).

The coordinate conversion unit 143 then performs the following.

(1) The coordinate conversion unit 143 determines that the area P1 is the left edge portion area of the main subject 202 based on the fact that the depth value DL changes from the depth value D1 to a value greater than or equal to D2_f in the area P1 in FIG. 5.

(2) The coordinate conversion unit 143 determines that the area P2 is the right edge portion area of the main subject 202 based on the fact that the depth value DL changes from a value greater than or equal to the depth value D2_f to D1 in the area P2 in FIG. 5.

Next, the coordinate conversion unit 143 sets the processing mode to either of the followings based on the mode setting signal MODE output from the control unit 105.

(1) The "stretching mode" in which the left edge side of the subject in the L image is stretched, and the right edge side of the subject in the R image is stretched.

(2) The "compressing mode" in which the right edge side of the subject in the L image is compressed, and the right edge side of the subject in the R image is compressed.

The followings are separate descriptions of processing in the case of the "stretching mode" and processing in the case of the "compressing mode".

<<Processing in Stretching Mode>>

First, processing in the case of the stretching mode will be described.

Figure 7A:
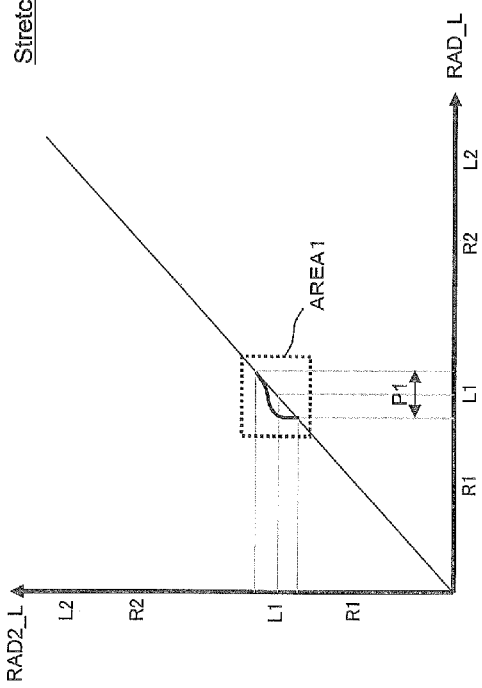
FIGS. 7A and 7B are diagrams for illustrating address conversion characteristics in a stretching mode according to the first embodiment.
Figure 7B:
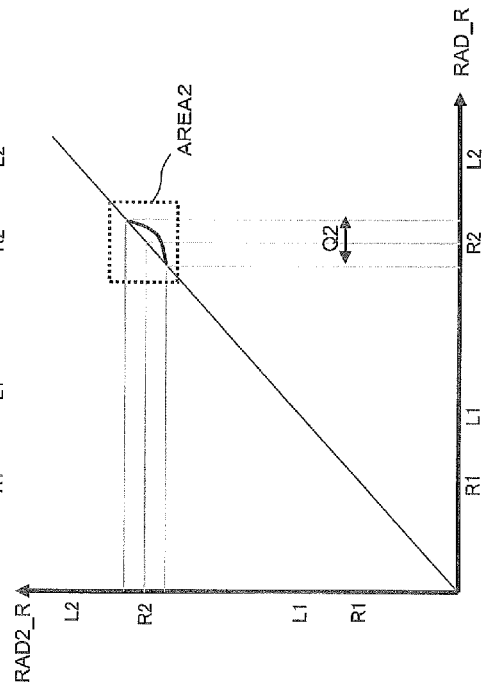

FIGS. 7A and 7B are diagrams showing address conversion characteristics in the case of the stretching mode. In FIGS. 7A and 7B, the horizontal axis indicates input addresses (readout addresses before conversion), and the vertical axis indicates output addresses (readout addresses after conversion).

Specifically, FIG. 7A is a graph showing address conversion characteristics (address conversion characteristics of the coordinate conversion unit of the L-image image correction unit 104L) for enlarging (stretching) the left edge portion area of the main subject 202 in the L image. FIG. 7B is a graph showing address conversion characteristics (address conversion characteristics of the coordinate conversion unit of the R-image image correction unit 104R) for enlarging (stretching) the right edge portion area of the main subject 202 in the R image. Note that in FIGS. 7A and 7B, the addresses indicated by "R1", "L1", "R2", and "L2" are addresses where data (signal values) corresponding to "R1", "L1", "R2", and "L2" in FIGS. 3 and 5 is stored (in the memory unit 141).

The coordinate conversion unit 143 acquires a converted readout address RAD2_L by performing address conversion processing based on a readout address RAD_L instructed by the control unit 105.

Specifically, the coordinate conversion unit 143 performs the address conversion processing through the following processing (1) and (2). Note that it is assumed that L image signal data pieces (signal values) have been successively written to the memory unit 141 in accordance with writing addresses WAD_L instructed by the control unit 105, and that the data pieces written to the addresses WAD_L in the memory unit 141 can be read out from the memory unit 141 in accordance with the readout addresses RAD_L, which have the same address values as the writing addresses WAD_L.

(1) In the case where a readout address RAD_L is an address to which L image signal data (signal value) corresponding to an area other than the area P1 in FIG. 5 has been written, the coordinate conversion unit 143 acquires the following (i.e., the same address value as the readout address RAD_L) as the readout address RAD2_L in accordance with the address conversion characteristics shown in FIG. 7.

$$RAD2\_L = RAD\_L$$

The coordinate conversion unit 143 then outputs an integer portion RAD2_L_Int of the acquired readout address RAD2_L to the memory unit 141, and outputs a decimal portion RAD2_L_Deci of the acquired readout address RAD2_L to the interpolation unit 144.

(2) In the case where a readout address RAD_L is an address to which L image signal data (signal value) corresponding to an area in the area P1 in FIG. 5 has been written, the coordinate conversion unit 143 performs address conversion in accordance with the address conversion characteristics shown in FIG. 7. This address conversion will be described below with reference to FIG. 8.

Figure 8:
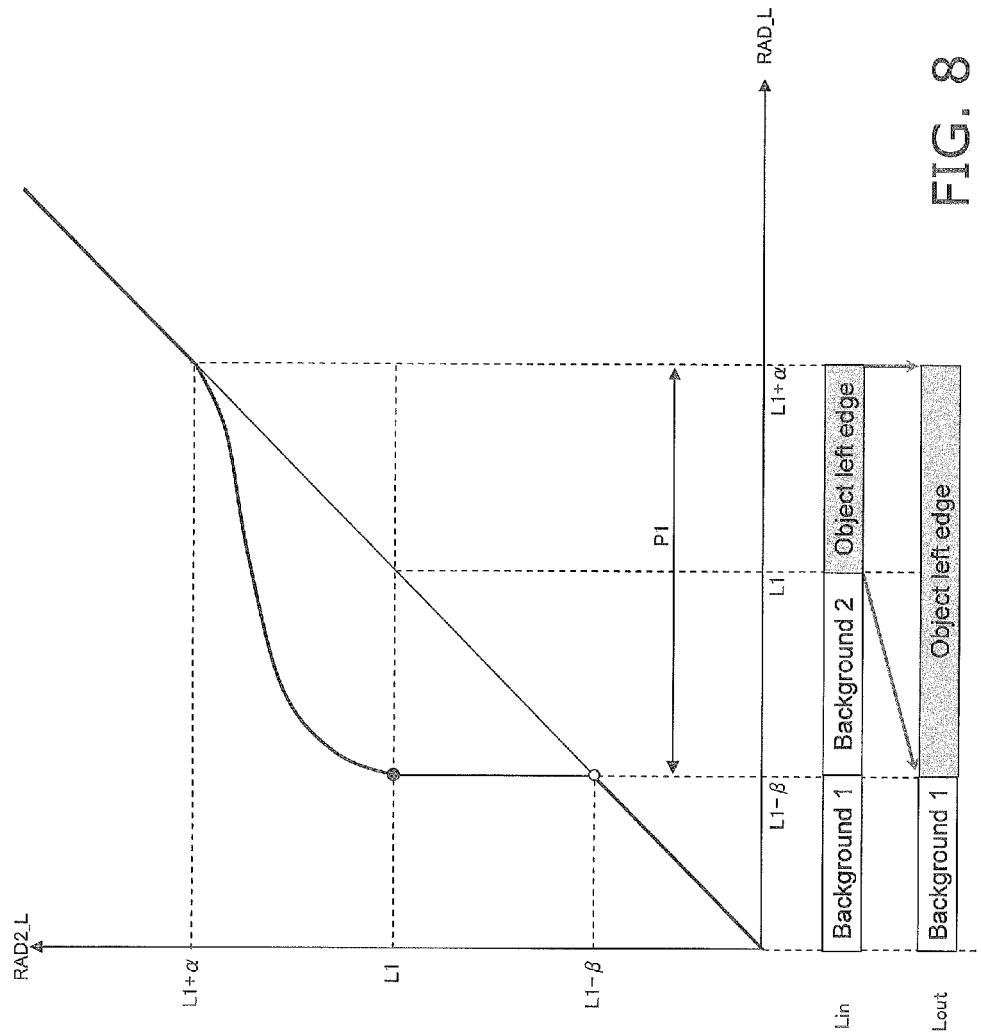
FIG. 8 is a diagram for illustrating address conversion characteristics in the stretching mode according to the first embodiment.

FIG. 8 is an enlarged view of the area indicated by AREA1 in FIG. 7A.

As shown in FIG. 8, in the case where the readout address RAD_L is an address value corresponding to an address in the area P1, the coordinate conversion unit 143 performs address conversion such that the left edge portion area of the main subject 202 is extended, and acquires the converted readout address RAD2_L.

Specifically, as shown in FIG. 8, when RAD_L=(L1−β) (The address value corresponding to "L1−β" is sometimes simply referred to as "L1−β". The same follows hereinafter.), address conversion is performed as shown below.

$$RAD2\_L = L1$$

By reading out the data (signal value) of the L image signal Lin from the memory unit 141 using the converted readout address RAD2_L(=L1), the coordinate conversion unit 143 can read out the data (signal value) for a position corresponding to "L1" at a position corresponding to "L1−β" in the L image.

Similarly, address values (L1−β to L1+α) corresponding to addresses in the area P1 are converted into address values (L1 to L1+α).

In other words, as described above, by performing address conversion processing and reading out L image Lin data (signal values) from the memory unit 141 using the converted address values, the coordinate conversion unit 143 can stretch the left edge portion area of the main subject 202 as shown in the lower level of FIG. 8. Specifically, as described above, by performing address conversion processing and reading out L image Lin data (signal values) from the memory unit 141 using the converted address values, the coordinate conversion unit 143 can stretch the left edge portion (L1 to L1+α area) of the main subject 202 of the input L image Lin to the L1−β to L1+α area as shown in the lower level of FIG. 8. (A background 2 portion is replaced with the stretched left edge portion area of the main subject 202.)

Note that it is preferable that the conversion characteristics of the curved line portion (L1−β to L1+α portion) of the address conversion characteristics shown in FIG. 8 exhibits a characteristics curve (or straight line) according to which the output address value RAD2_L increases monotonically for the input address value RAD_L.

For example, the coordinate conversion unit 143 may perform address conversion processing by multiplying the signal value of ΔDL1, which is the intensity signal K1_L, by an appropriate gain (μ) as shown below.

$$RAD2\_L = RAD\_L + \mu \cdot K1\_L$$

Note that in the above expression, the magnitude of μ is set at or below a level at which even at its highest, monotonicity is not impaired.

The coordinate conversion unit 143 performs address conversion processing as described above.

The following describes processing performed by the coordinate conversion unit 143 of the R-image image correction unit 104R in the stretching mode.

The coordinate conversion unit 143 of the R-image image correction unit 104R performs address conversion processing using the address conversion characteristics shown in FIG. 7B. Since the basic processing is similar to the processing performed by the coordinate conversion unit 143 of the L-image image correction unit 104L, the following describes differing points.

The coordinate conversion unit 143 of the R-image image correction unit 104R acquires a converted readout address RAD2_R by performing address conversion processing based on a readout address RAD_R instructed by the control unit 105.

Specifically, the coordinate conversion unit 143 of the R-image image correction unit 104R performs address conversion processing through the following processing (1) and (2). Note that it is assumed that R image signal data pieces (signal values) have been successively written to the memory unit 141 in accordance with writing addresses WAD_R instructed by the control unit 105, and that the data pieces written to the addresses WAD_R in the memory unit 141 can be read out from the memory unit 141 in accordance with the readout addresses RAD_R, which have the same address values as the writing addresses WAD_R.

(1) In the case where a readout address RAD_R is an address to which R image signal data (signal value) corresponding to an area other than the area Q2 in FIG. 5 has been written, the coordinate conversion unit 143 acquires the following (i.e., the same address value as the readout address RAD_R) as the readout address RAD2_R in accordance with the address conversion characteristics shown in FIG. 7B.

$$RAD2\_R = RAD\_R$$

The coordinate conversion unit 143 then outputs an integer portion RAD2_R_Int of the acquired readout address RAD2_R to the memory unit 141, and outputs a decimal portion RAD2_R_Deci of the acquired readout address RAD2_R to the interpolation unit 144.

(2) In the case where a readout address RAD_R is an address to which R image signal data (signal value) corresponding to an area in the area Q2 in FIG. 5 has been written, the coordinate conversion unit 143 performs address conversion in accordance with the address conversion characteristics shown in FIG. 7B. This address conversion will be described below with reference to FIG. 9.

Figure 9:
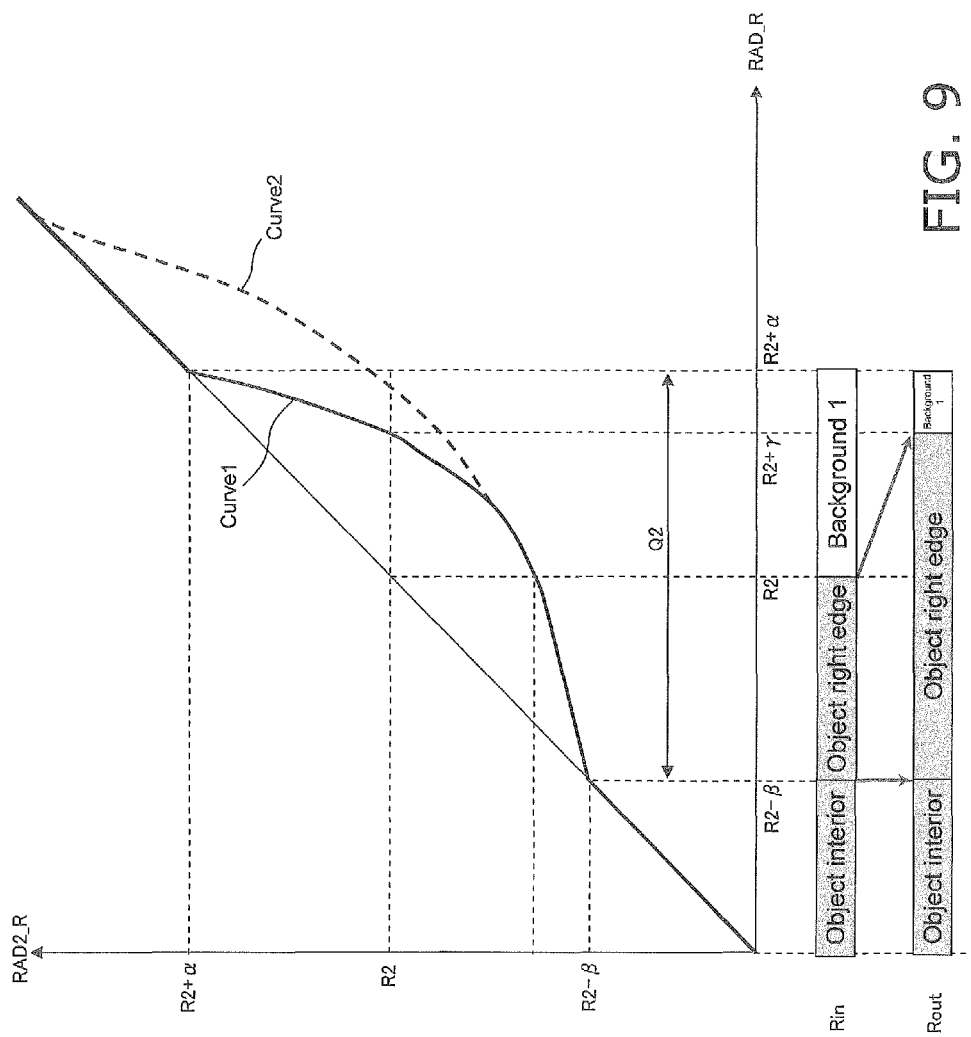
FIG. 9 is a diagram for illustrating address conversion characteristics in the stretching mode according to the first embodiment.

FIG. 9 is an enlarged view of the area indicated by AREA2 in FIG. 7B.

As shown in FIG. 9, in the case where the readout address RAD_R is an address value corresponding to an address in the area Q2, the coordinate conversion unit 143 performs address conversion such that the right edge portion area of the main subject 202 is extended, and acquires the converted readout address RAD2_R.

In other words, according to the address conversion characteristics curve shown in FIG. 9, (A) in the case where RAD_R is included in the R2−β to R2 area, the slope of the address conversion characteristics curve is low, and (B) in the case where RAD_R is included in the R2 to R2+α area, the slope of the address conversion characteristics curve is high.

The coordinate conversion unit 143 can extend (stretch) the right edge portion area of the main subject 202 by performing address conversion processing using an address conversion characteristics curve Curve1 shown in FIG. 9.

In other words, as described above, by performing address conversion processing and reading out R image Rin data (signal values) from the memory unit 141 using the converted address values, the coordinate conversion unit 143 can stretch the right edge portion area of the main subject 202 as shown in the lower level of FIG. 9. Specifically, as described above, by performing address conversion processing and reading out R image Rin data (signal values) from the memory unit 141 using the converted address values, the coordinate conversion unit 143 can stretch the right edge portion (R2−β to R2 area) of the main subject 202 of the input R image Rin to the R2−β to R2+α area as shown in the lower level of FIG. 9. (A background 1 portion (R2 to R2+α portion) of the input R image Rin is compressed (shrunk) to the (R2+γ to R2+α) area.)

Note that it is preferable that the conversion characteristics of the curved line portion (R2−β to R2+α portion) of the address conversion characteristics shown in FIG. 9 exhibits a characteristics curve (or straight line) according to which the output address value RAD2_R increases monotonically for the input address value RAD_R.

For example, the coordinate conversion unit 143 may perform address conversion processing by multiplying the signal value of ΔDR1, which is the intensity signal K1_R, by an appropriate gain (μ) as shown below.

$$RAD2\_R = RAD\_R - \mu \cdot K1\_R$$

Note that in the above expression, the magnitude of μ is set at or below a level at which even at its highest, monotonicity is not impaired.

The coordinate conversion unit 143 of the R-image image correction unit 104R performs address conversion processing as described above.

Note that in the address conversion processing, the coordinate conversion unit 143 of the R-image image correction unit 104R may perform address conversion processing using a curve Curve2 shown by the dashed line in FIG. 9. Specifically, compared to the curve Curve1 in FIG. 9, the curve Curve2 shown by the dashed line in FIG. 9 has a low slope in the area R2+γ to R2+α, and changes so as to rise gently and then match the straight line RAD2_R=RAD_R. Accordingly, by performing address conversion using the curve Curve2, the coordinate conversion unit 143 of the R-image image correction unit 104R can prevent the background 1 shown in the lower level of FIG. 9 from being drastically compressed, and as a result can acquire an R image in which the background 1 portion is smoothly compressed.

As described above, the converted addresses RAD2_L and RAD2_R are respectively output from the coordinate conversion unit 143 to the memory unit 141 and the interpolation unit 144 in the L-image image correction unit 104L and the R-image image correction unit 104R.

Note that whereas the input addresses RAD_L and RAD_R are integers, the output addresses RAD2_L and RAD2_R have decimal portions. Here, it is assumed that the output addresses RAD2_L and RAD2_R have 4-bit decimals.

L image Lin data (a signal value) stored in the memory unit 141 is read out from the address designated by RAD2_L_Int, which is the integer portion of the readout address RAD2_L output from the coordinate conversion unit 143. The following is a specific description of processing for reading out data from the memory unit 141 with reference to FIG. 10.

Figure 10:
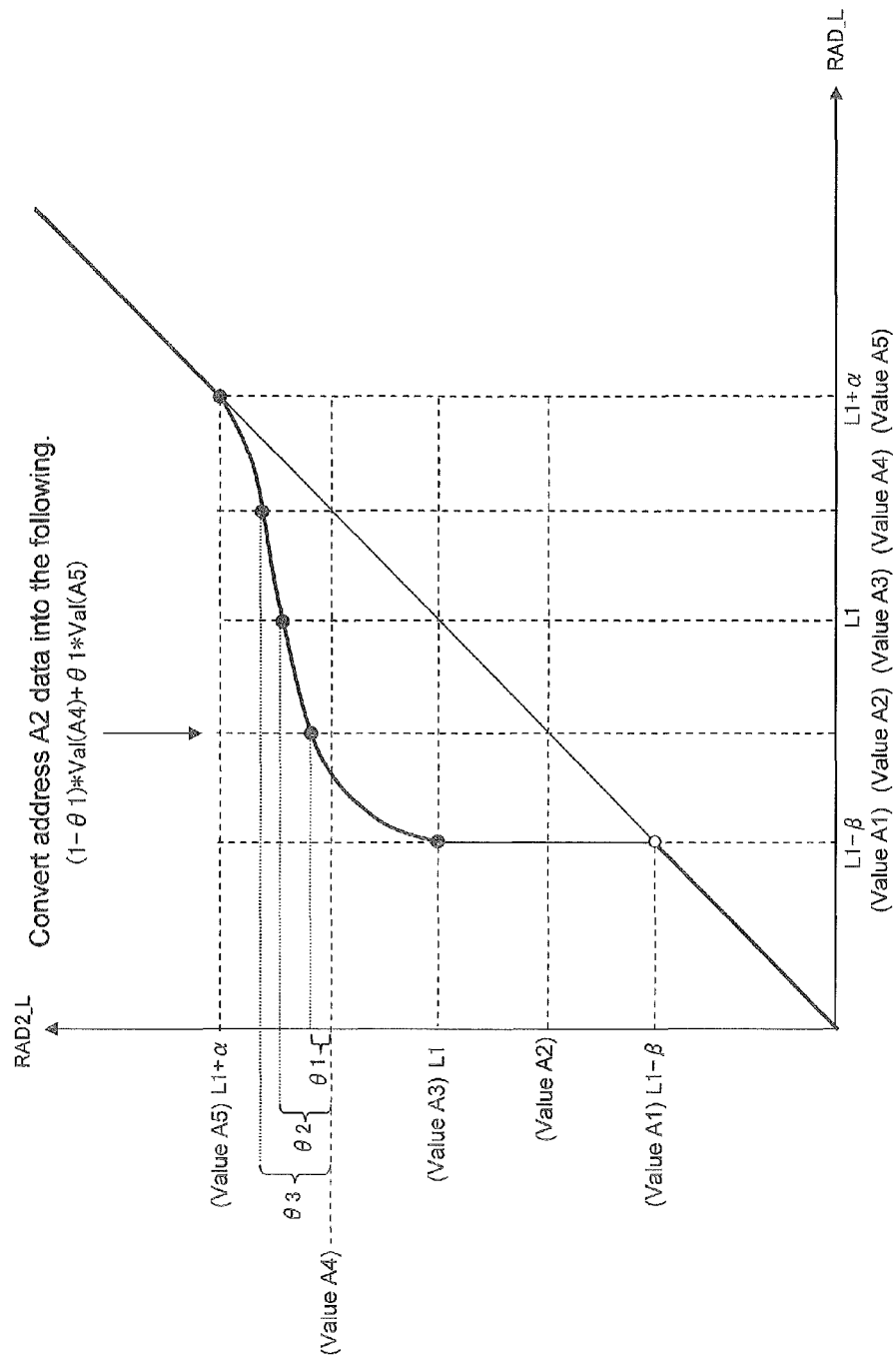
FIG. 10 is a diagram for illustrating address conversion processing and interpolation processing in the stretching mode according to the first embodiment.

Similarly to FIG. 8, FIG. 10 is an enlarged view of the AREA1 portion in FIG. 7. Note that address values A1 to A5 shown in FIG. 10 are assumed to be integer values.

When decimal portion of output address value is "0":

As shown in FIG. 10, in the case of RAD_L=A1 (address value A1 corresponding to L1−β), the coordinate conversion unit 143 outputs RAD2_L=A3 (address value A3 corresponding to L1) as the converted address RAD2_L.

At this time, since RAD2_L=A3, and the decimal portion RAD2_L_Deci of RAD2_L is "0", the coordinate conversion unit 143 instructs the memory unit 141 to read out the data (signal value) Val(A3) (Val(X) indicating the data value stored at the address value X) stored at the address RAD2_L_Int=A3. Also, the coordinate conversion unit 143 outputs the decimal portion RAD2_L_Deci (=0) of RAD2_L to the interpolation unit 144.

Then, since RAD2_L_Deci=0, the interpolation unit 144 outputs, as the output L image signal Lout, the data (signal value) Val(A3) input from the memory unit 141 as is, without executing interpolation processing.

When decimal portion of output address value is not "0":

However, as shown in FIG. 10, in the case where RAD_L=A2, the coordinate conversion unit 143 outputs RAD2_L=A4+θ1 as the converted address RAD2_L.

At this time, since $$RAD2\_L\_Int = A4$$

$$RAD2\_L\_Deci = \theta1 \, (0 < \theta1 \le 1)$$

the coordinate conversion unit 143 orders to read out from the memory unit 141 the data (signal value) Val(A4) stored at the address RAD2_L_Int=A4, and the data (signal value) Val (A5) stored at the address RAD2_L_Int=A5 (address value A5 whose address value is "1" greater than the address value A4).

Also, the coordinate conversion unit 143 outputs the decimal portion RAD2_L_Deci (=θ1) of RAD2_L to the interpolation unit 144.

Then, since RAD2_L_Deci=θ1, the interpolation unit 144 executes interpolation processing corresponding to the following expression using the data (signal values) Val(A4) and Val(A5) input from the memory unit 141.

$$Lout = (1 - \theta1) \times Val(A4) + \theta1 \times Val(A5)$$

The interpolation unit 144 then outputs the value acquired from the interpolation processing as the output L image signal Lout.

Note that in the cases of RAD_L=A2, A3, and A4 as well, the decimal portion of the output address value is also not "0", and therefore processing similar to that described above is executed.

Also, even if the above-described interpolation calculation is performed in the case where the decimal portion of the output address value is "0", the output address that is obtained is the same as that in the case of not performing the interpolation calculation, and therefore either is possible in the specific configuration of the interpolation calculation.

By performing processing as described above, the three-dimensional imaging device 1000 can smoothly perform subtle coordinate conversion on the L image in the left edge portion area of the main subject 202.

Note that processing similar to that described above is performed also for the right edge portion area (area shown by AREA2 and area Q2 in FIG. 7) of the main subject 202.

Figure 11:
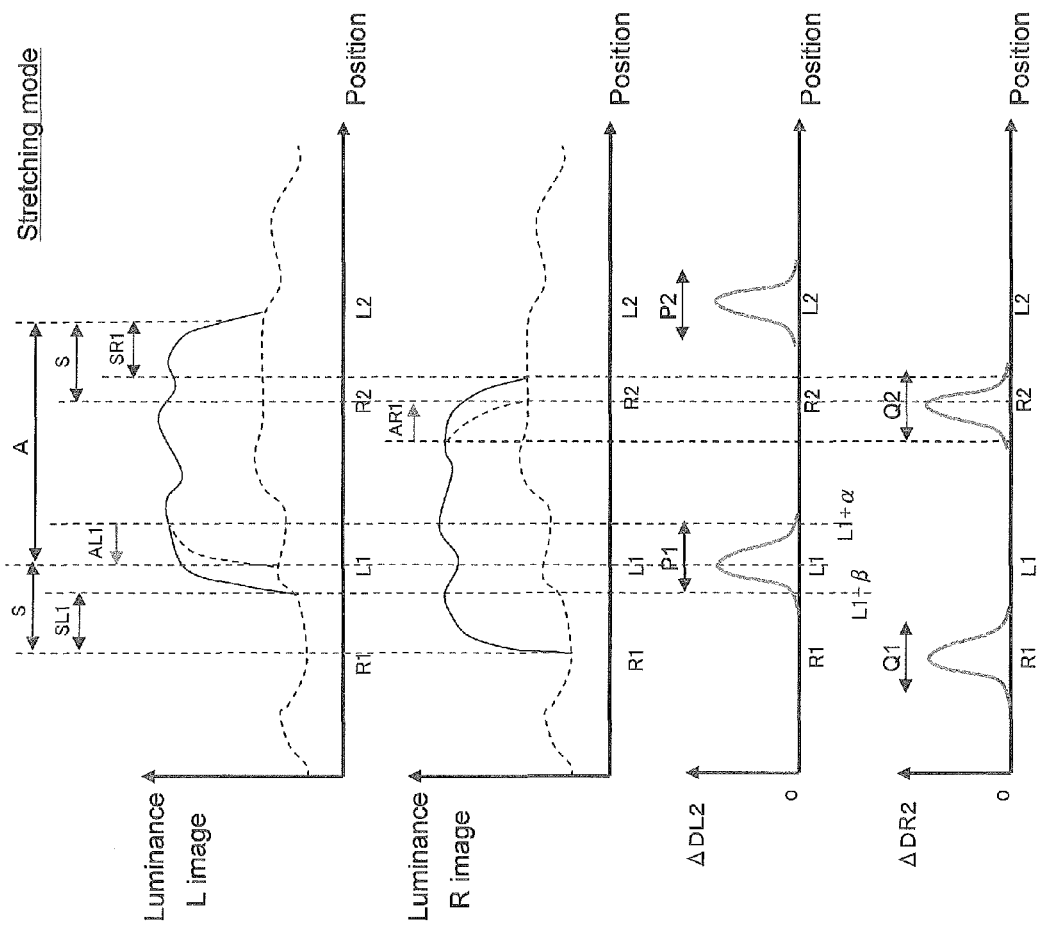
FIG. 11 shows processing results of processing performed in the stretching mode by the three-dimensional imaging device 1000 according to the first embodiment.

FIG. 11 shows processing results in the case where the three-dimensional imaging device 1000 performed the above processing (processing results in the stretching mode).

As is understood from FIG. 11, the vicinity of the contour on the left side (left edge portion area) of the main subject 202 in the L image is smoothly stretched to the left as shown by an arrow AL1 in FIG. 11.

Similarly, the contour on the right side (right edge portion area) of the main subject 202 in the R image is smoothly stretched to the right as shown by an arrow AR1 in FIG. 11.

As a result, in the three-dimensional images subjected to the above-described processing by the three-dimensional imaging device 1000, the disparity in the interior (inner area) of the target object (main subject 202) is S, which is no different from that in the input images, and therefore the subject distance (distance from the viewpoint to the normal position of the target object) is the same in three-dimensional viewing.

On the other hand, (1) since the left contour (left edge portion area) of the main subject 202 is stretched to the left in the L image, the disparity at the left contour (left edge portion area) in the L image is SL1, and (2) since the right contour (right edge portion area) of the main subject 202 is stretched to the right in the R image, the disparity at the left contour (left edge portion area) in the R image is SR1. Since $$SL1 < S$$

$$SR1 < S$$

the disparity in the three-dimensional image acquired by the three-dimensional imaging device 1000 changes so as to become farther away. For this reason, the vicinity of the contour (left edge portion area and right edge portion area) of the target object (main subject 202) is slightly farther away than the interior of the target object (main subject 202). As a result, in the three-dimensional images acquired by the three-dimensional imaging device 1000, a sense of roundness is expressed such that the vicinity of the contour of the target object (main subject 202) curves toward a distance.

When the sense of roundness in the vicinity of the contour is perceived, a three-dimensional object, not a planar object, is recognized by the brain, thus reducing the cardboard effect. Accordingly, by performing processing as described above, the three-dimensional imaging device 1000 can acquire three-dimensional images in which the cardboard effect is reduced.

<Processing in Compressing Mode>>

Next, processing in the case of the compressing mode will be described.

Note that portions that are similar to the processing in the stretching mode will not be described.

FIGS. 12A and 12B are diagrams showing address conversion characteristics in the case of the compressing mode. In FIGS. 12A and 12B, the horizontal axis indicates input addresses (readout addresses before conversion), and the vertical axis indicates output addresses (readout addresses after conversion).

Specifically, FIG. 12A is a graph showing address conversion characteristics (address conversion characteristics of the coordinate conversion unit of the L-image image correction unit 104L) for narrowing (compressing) the right edge portion area of the main subject 202 in the L image. FIG. 12B is a graph showing address conversion characteristics (address conversion characteristics of the coordinate conversion unit of the R-image image correction unit 104R) for narrowing (compressing) the left edge portion area of the main subject 202 in the R image Note that in FIGS. 12A and 12B, the addresses indicated by "R1", "L1", "R2", and "L2" are addresses where data (signal values) corresponding to "R1", "L1", "R2", and "L2" in FIGS. 3 and 5 is stored (in the memory unit 141).

The processing performed by the coordinate conversion unit 143, the memory unit 141, and the interpolation unit 144 is similar to the above-described processing performed by the coordinate conversion unit 143, the memory unit 141, and the interpolation unit 144 in the stretching mode.

A difference is that whereas the address conversion characteristics in the stretching mode are those shown in FIGS. 7A and 7B, the address conversion characteristics in the compressing mode are those shown in FIGS. 12A and 12B.

In the compressing mode, processing is executed by the coordinate conversion unit 143, the memory unit 141, and the interpolation unit 144 in accordance with the address conversion characteristics shown in FIGS. 12A and 12B, and therefore the right edge portion area of the main subject 202 is compressed (shrunk) in the L image, and the left edge portion area of the main subject 202 is compressed (shrunk) in the R image.

Specifically, FIG. 12A is a graph showing address conversion characteristics (address conversion characteristics of the coordinate conversion unit of the L-image image correction unit 104L) for narrowing (compressing) the right edge portion area of the main subject 202 in the L image. FIG. 12B is a graph showing address conversion characteristics (address conversion characteristics of the coordinate conversion unit of the R-image image correction unit 104R) for narrowing (compressing) the left edge portion area of the main subject 202 in the R image. Note that in FIGS. 12A and 12B, the addresses indicated by "R1", "L1", "R2", and "L2" are addresses where data (signal values) corresponding to "R1", "L1", "R2", and "L2" in FIGS. 3 and 5 is stored (in the memory unit 141).

The coordinate conversion unit 143 acquires a converted readout address RAD2_L by performing address conversion processing based on a readout address RAD_L instructed by the control unit 105.

Specifically, the coordinate conversion unit 143 performs the address conversion processing through the following processing (1) and (2). Note that it is assumed that L image signal data pieces (signal values) have been successively written to the memory unit 141 in accordance with writing addresses WAD_L instructed by the control unit 105, and that the data pieces written to the addresses WAD_L in the memory unit 141 can be read out from the memory unit 141 in accordance with the readout addresses RAD_L, which have the same address values as the writing addresses WAD_L.

Figure 12:
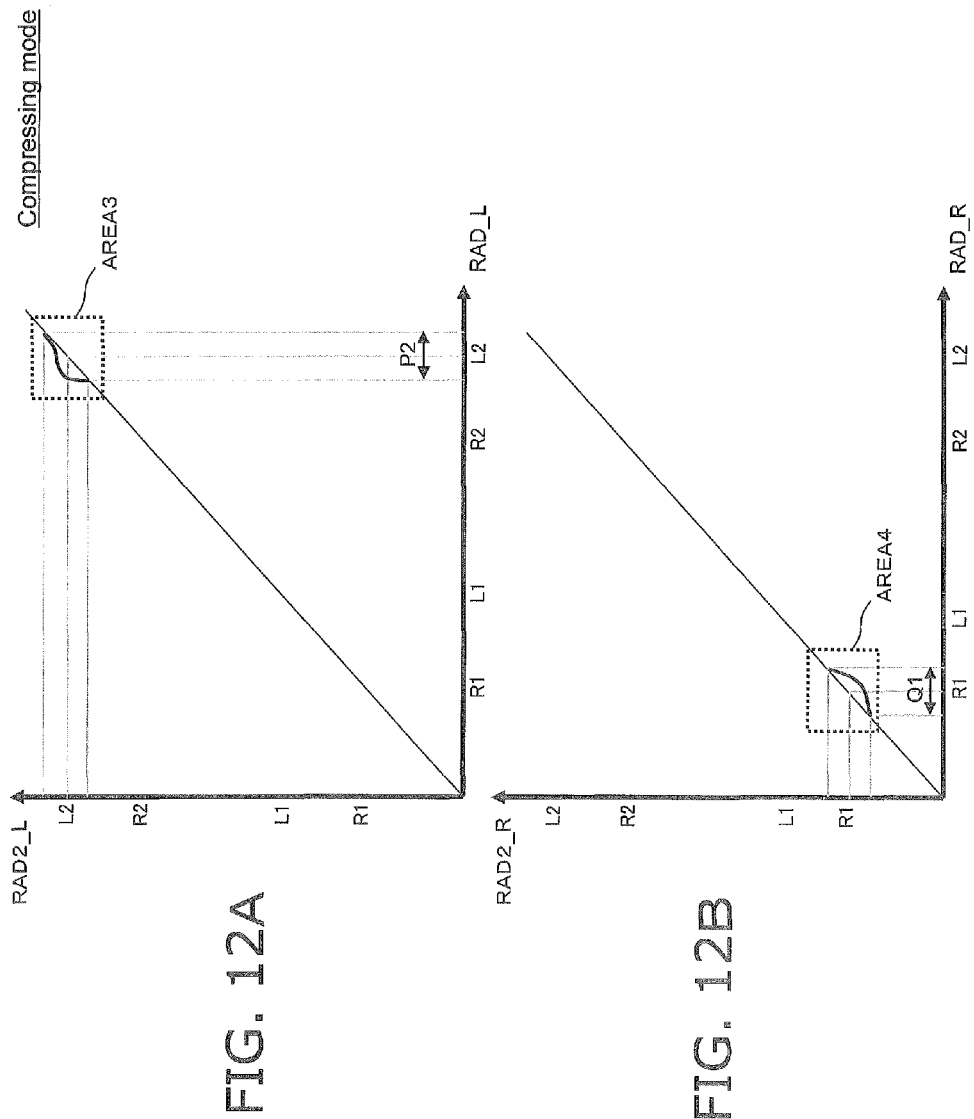
FIGS. 12A and 12B are diagrams for illustrating address conversion characteristics in a compressing mode according to the first embodiment.

(1) In the case where a readout address RAD_L is an address to which L image signal data (signal value) corresponding to an area other than the area P2 in FIG. 5 has been written, the coordinate conversion unit 143 acquires the following (i.e., the same address value as the readout address RAD_L) as the readout address RAD2_L in accordance with the address conversion characteristics shown in FIG. 12.

$$RAD2\_L = RAD\_L$$

The coordinate conversion unit 143 then outputs an integer portion RAD2_L_Int of the acquired readout address RAD2_L to the memory unit 141, and outputs a decimal portion RAD2_L_Deci of the acquired readout address RAD2_L to the interpolation unit 144.

(2) In the case where a readout address RAD_L is an address to which L image signal data (signal value) corresponding to an area in the area P2 in FIG. 5 has been written, the coordinate conversion unit 143 performs address conversion in accordance with the address conversion characteristics shown in FIG. 12. This address conversion will be described below with reference to FIG. 13.

Figure 13:
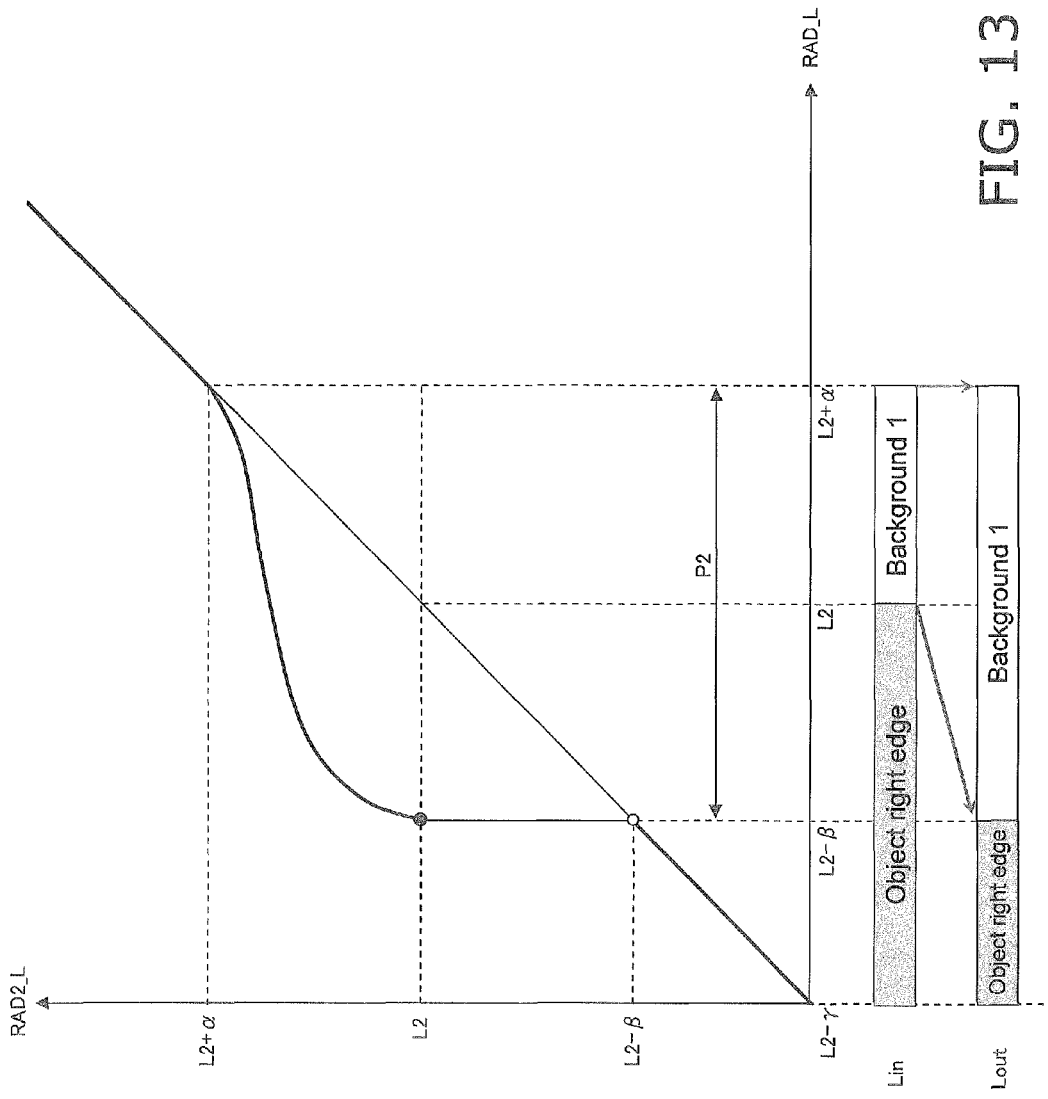
FIG. 13 is a diagram for illustrating address conversion characteristics in the compressing mode according to the first embodiment.

FIG. 13 is an enlarged view of the area indicated by AREA3 in FIG. 12A.

As shown in FIG. 13, in the case where the readout address RAD_L is an address value corresponding to an address in the area P2, the coordinate conversion unit 143 performs address conversion such that the right edge portion area of the main subject 202 is compressed, and acquires the converted readout address RAD2_L.

Specifically, as shown in FIG. 13, when RAD_L=(L2−β) (The address value corresponding to "L2−β" is sometimes simply referred to as "L2−β". The same follows hereinafter.), address conversion is performed as shown below.

$$RAD2\_L = L2$$

By reading out the data (signal value) of the L image signal Lin from the memory unit 141 using the converted readout address RAD2_L (=L2), the coordinate conversion unit 143 can read out the data (signal value) for a position corresponding to "L2" at a position corresponding to "L2−β" in the L image.

Similarly, address values (L2−β to L2+α) corresponding to addresses in the area P2 are converted into address values (L2 to L2+α).

In other words, as described above, by performing address conversion processing and reading out L image Lin data (signal values) from the memory unit 141 using the converted address values, the coordinate conversion unit 143 can compress the right edge portion area of the main subject 202 as shown in the lower level of FIG. 13. Specifically, as described above, by performing address conversion processing and reading out L image Lin data (signal values) from the memory unit 141 using the converted address values, the coordinate conversion unit 143 can compress the right edge portion (L2−γ to L2 area) of the main subject 202 of the input L image Lin to the L2−γ to L2−β area as shown in the lower level of FIG. 13. (An L2 to L2+α background 1 portion is stretched to L2−β to L2+α.)

Note that it is preferable that the conversion characteristics of the curved line portion (L2−β to L2+α portion) of the address conversion characteristics shown in FIG. 13 exhibits a characteristics curve (or straight line) according to which the output address value RAD2_L increases monotonically for the input address value RAD_L.

For example, the coordinate conversion unit 143 may perform address conversion processing by multiplying the signal value of ΔDL1, which is the intensity signal K1_L, by an appropriate gain (μ) as shown below.

$$RAD2\_L = RAD\_L + \mu \cdot K1\_L$$

Note that in the above expression, the magnitude of μ is set at or below a level at which even at its highest, monotonicity is not impaired.

The coordinate conversion unit 143 performs address conversion processing as described above.

The following describes processing performed by the coordinate conversion unit 143 of the R-image image correction unit 104R in the compressing mode.

The coordinate conversion unit 143 of the R-image image correction unit 104R performs address conversion processing using the address conversion characteristics shown in FIG. 12B. Since the basic processing is similar to the processing performed by the coordinate conversion unit 143 of the L-image image correction unit 104L, the following describes differing points.

The coordinate conversion unit 143 of the R-image image correction unit 104R acquires a converted readout address RAD2_R by performing address conversion processing based on a readout addresses RAD_R instructed by the control unit 105.

Specifically, the coordinate conversion unit 143 of the R-image image correction unit 104R performs address conversion processing through the following processing (1) and (2). Note that it is assumed that R image signal data pieces (signal values) have been successively written to the memory unit 141 in accordance with writing addresses WAD_R instructed by the control unit 105, and that the data pieces written to the addresses WAD_R in the memory unit 141 can be read out from the memory unit 141 in accordance with the readout addresses RAD_R, which have the same address values as the writing addresses WAD_R.

(1) In the case where a readout address RAD_R is an address to which R image signal data (signal value) corresponding to an area other than the area Q1 in FIG. 5 has been written, the coordinate conversion unit 143 acquires the following (i.e., the same address value as the readout address RAD_R) as the readout address RAD2_R in accordance with the address conversion characteristics shown in FIG. 12B.

$$RAD2\_R = RAD\_R$$

The coordinate conversion unit 143 then outputs an integer portion RAD2_R_Int of the acquired readout address RAD2_R to the memory unit 141, and outputs a decimal portion RAD2_R_Deci of the acquired readout address RAD2_R to the interpolation unit 144.

(2) In the case where a readout address RAD_R is an address to which R image signal data (signal value) corresponding to an area in the area Q1 in FIG. 12 has been written, the coordinate conversion unit 143 performs address conversion in accordance with the address conversion characteristics shown in FIG. 12B. This address conversion will be described below with reference to FIG. 14.

Figure 14:
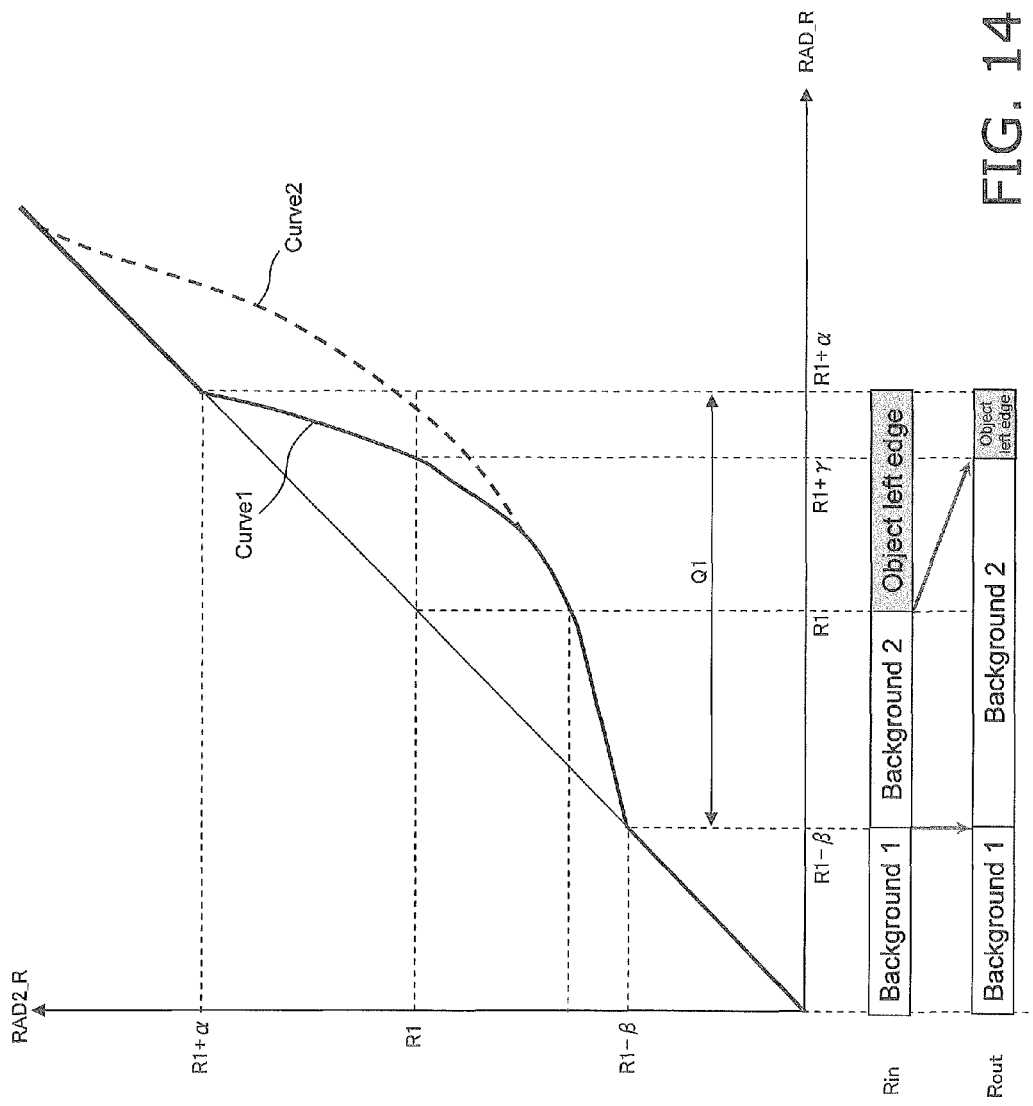
FIG. 14 is a diagram for illustrating address conversion characteristics in the compressing mode according to the first embodiment.

FIG. 14 is an enlarged view of the area indicated by AREA4 in FIG. 12B.

As shown in FIG. 14, in the case where the readout address RAD_R is an address value corresponding to an address in the area Q1, the coordinate conversion unit 143 performs address conversion such that the left edge portion area of the main subject 202 is compressed, and acquires the converted readout address RAD2_R.

In other words, according to the address conversion characteristics curve shown in FIG. 14, (A) in the case where RAD_R is included in the R1−β to R1 area, the slope of the address conversion characteristics curve is low, and (B) in the case where RAD_R is included in the R1 to R1+α area, the slope of the address conversion characteristics curve is high.

The coordinate conversion unit 143 can compress the left edge portion area of the main subject 202 by performing address conversion processing using an address conversion characteristics curve Curve1 shown in FIG. 14.

In other words, as described above, by performing address conversion processing and reading out R image Rin data (signal values) from the memory unit 141 using the converted address values, the coordinate conversion unit 143 can compress the left edge portion area of the main subject 202 as shown in the lower level of FIG. 14. Specifically, as described above, by performing address conversion processing and reading out R image Rin data (signal values) from the memory unit 141 using the converted address values, the coordinate conversion unit 143 can compress the left edge portion (R1 to R1+α area) of the main subject 202 of the input R image Rin to the R1+γ to R1+α area as shown in the lower level of FIG. 14. (A background 2 portion (R1−β to R1 portion) of the input R image Rin is extended to the (R1−β to R1+γ) area.)

Note that it is preferable that the conversion characteristics of the curved line portion (R1−β to R1+α portion) of the address conversion characteristics shown in FIG. 14 exhibits a characteristics curve (or straight line) according to which the output address value RAD2_R increases monotonically for the input address value RAD_R.

For example, the coordinate conversion unit 143 may perform address conversion processing by multiplying the signal value of ΔDR1, which is the intensity signal K1_R, by an appropriate gain (μ) as shown below.

$$RAD2\_R = RAD\_R - \mu \cdot K1\_R$$

Note that in the above expression, the magnitude of μ is set at or below a level at which even at its highest, monotonicity is not impaired.

The coordinate conversion unit 143 of the R-image image correction unit 104R performs address conversion processing as described above.

Note that in the address conversion processing, the coordinate conversion unit 143 of the R-image image correction unit 104R may perform address conversion processing using a curve Curve2 shown by the dashed line in FIG. 14. Specifically, compared to the curve Curve1 in FIG. 14, the curve Curve2 shown by the dashed line in FIG. 14 has a low slope in the area R2+γ to R2+α, and changes so as to rise gently and then match the straight line RAD2_R=RAD_R. Accordingly, by performing address conversion using the curve Curve2, the coordinate conversion unit 143 of the R-image image correction unit 104R can prevent the left edge of the object shown in the lower level of FIG. 14 from being drastically compressed, and as a result can acquire an R image in which the left edge portion of the object is smoothly compressed.

As described above, the converted addresses RAD2_L and RAD2_R are respectively output from the coordinate conversion unit 143 in the L-image image correction unit 104L and the R-image image correction unit 104R to the memory unit 141 and the interpolation unit 144.

Note that whereas the input addresses RAD_L and RAD_R are integers, the output addresses RAD2_L and RAD2_R have decimal portions. Here, it is assumed that the output addresses RAD2_L and RAD2_R have 4-bits after the decimal point.

Note that the subsequent processing is similar to the processing in the stretching mode.

Figure 15:
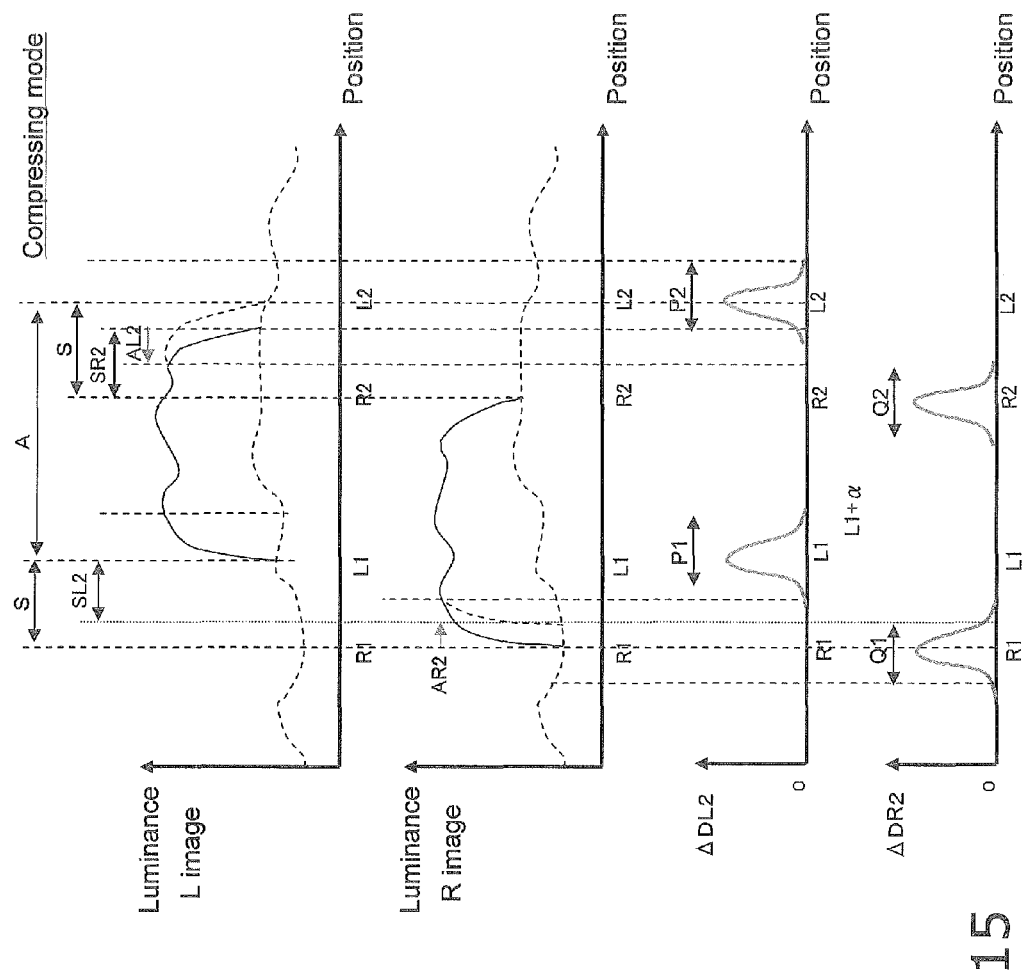
FIG. 15 shows processing results of processing performed in the compressing mode by the three-dimensional imaging device 1000 according to the first embodiment.

FIG. 15 shows processing results in the case where the three-dimensional imaging device 1000 performed the above processing (processing results in the compressing mode).

As is understood from FIG. 15, the vicinity of the contour on the right side (right edge portion area) of the main subject 202 in the L image is smoothly compressed to the left as shown by an arrow AL2 in FIG. 15.

Similarly, the contour on the left side (left edge portion area) of the main subject 202 in the R image is smoothly compressed to the right as shown by an arrow AR2 in FIG. 15.

As a result, in the three-dimensional images subjected to the above-described processing by the three-dimensional imaging device 1000, the disparity in the interior (inner area) of the target object (main subject 202) is S, which is no different from that in the input images, and therefore the subject distance (distance from the viewpoint to the normal position of the target object) is the same in three-dimensional viewing.

On the other hand, (1) since the right contour (right edge portion area) of the main subject 202 is compressed to the left in the L image, the disparity at the right contour (right edge portion area) in the L image is SR2, and (2) since the left contour (left edge portion area) of the main subject 202 is compressed to the right in the R image, the disparity at the left contour (left edge portion area) in the R image is SL2. Since $$SR2 < S$$

$$SL2 < S$$

the disparity in the three-dimensional image acquired by the three-dimensional imaging device 1000 changes so as to become farther away. For this reason, the vicinity of the contour (left edge portion area and right edge portion area) of the target object (main subject 202) is slightly farther away than the interior of the target object (main subject 202). As a result, in the three-dimensional images acquired by the three-dimensional imaging device 1000, a sense of roundness is expressed such that the vicinity of the contour of the target object (main subject 202) curves toward a distance.

When the sense of roundness in the vicinity of the contour is perceived, a three-dimensional object, not a planar object, is recognized by the brain, thus reducing the cardboard effect. Accordingly, by performing processing as described above, the three-dimensional imaging device 1000 can acquire three-dimensional images in which the cardboard effect is reduced.

Note that although processing in the stretching mode and processing in the compressing mode are described as separate processing, a method in which both are used is possible. With this method, images are subjected to little distortion, and there is also no change in the horizontal width of the target object, thus being superior in terms of image quality.

Other Embodiments

Although processing with respect to three-dimensional images from two viewpoints is described in the above embodiment, there is no limitation to this, and processing similar to that described in the above embodiment may be performed on, for example, three-dimensional images from multiple viewpoints (N viewpoints; N being a natural number greater than or equal to 3).

Note that in the case of executing N-viewpoint processing, it is sufficient to extend the two processing systems (R image processing system and L image processing system) of the above embodiment to N processing systems.

The following describes processing in the compressing mode and processing in the stretching mode in the case where N=4, that is to say, processing in the case of four viewpoints.

<<Processing in Compressing Mode in Case of Four Viewpoints>>

First, processing in the compressing mode in the case of four viewpoints will be described with reference to the drawings.

Figure 16:
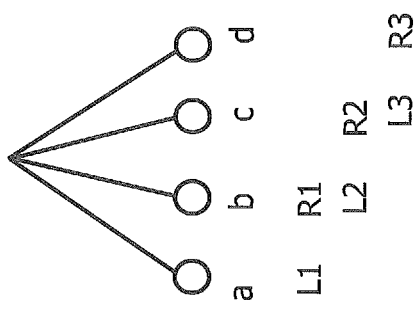
FIG. 16 is a diagram illustratively showing the spatial arrangement of four viewpoints.

FIG. 16 are diagrams illustratively showing the spatial arrangement of four viewpoints.

As shown in FIG. 16, the viewpoint positioned on the left-most side is point a, and points b, c, and d are positioned toward the right side, with the four viewpoints being arranged at equal intervals.

The following describes the case of executing processing in the compressing mode on images acquired from the four viewpoints in FIG. 16.

FIG. 17 show image signal waveforms of captured images acquired from the four viewpoints a to d in FIG. 16 in the imaging scene 200, where the horizontal axis indicates x coordinates (position coordinates in the x direction) in the captured images, and the vertical axis indicates luminance (corresponding to the pixel values (luminance values) of the pixels of the captured images).

Figures 17A, 17B, 17C, 17D:
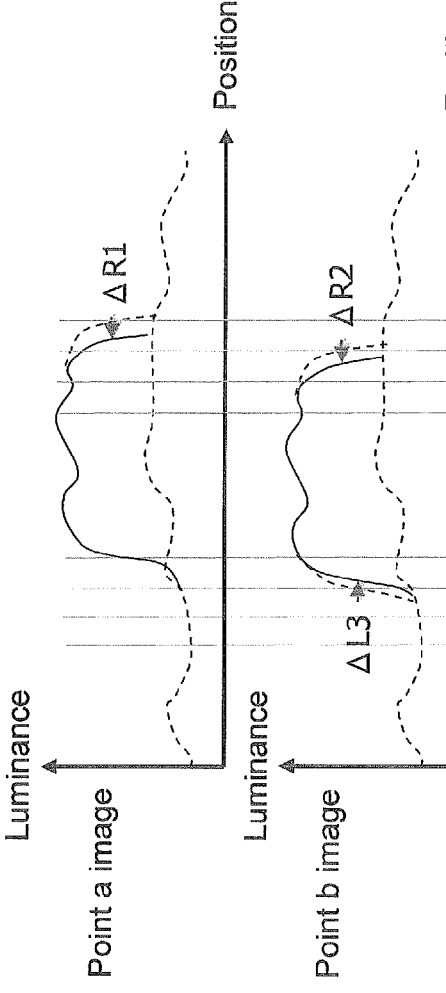
FIG. 17A to 17D are diagrams for illustrating processing in the compressing mode with the case of four viewpoints according to another embodiment.

Also, FIG. 17A shows the image acquired at the viewpoint a, FIG. 17B shows the image acquired at the viewpoint b, FIG. 17C shows the image acquired at the viewpoint c, and FIG. 17D shows the image acquired at the viewpoint d. Also, the x coordinates are drawn so as to match each other in FIG. 17A to D.

Also, in FIG. 17A to D, the dashed lines indicate the image signal waveforms before processing is performed on the captured images acquired at the four viewpoints a to d, and the solid lines indicate the image signal waveforms after processing.

In the processing in the compressing mode in the case of four viewpoints, it is sufficient to set compression amounts of object edges as shown below. Specifically, as shown in FIG. 17, it is sufficient to execute processing in the compressing mode on the images such that the expressions below are satisfied in the case where: in the point a image, $\Delta R1$ is the compression amount for the right edge of the object (main subject 202); in the point b image, $\Delta R2$ is the compression amount for the right edge of the object (main subject 202), and $\Delta L3$ is the compression amount for the left edge; in the point c image, $\Delta R3$ is the compression amount for the right edge of the object (main subject 202), and $\Delta L2$ is the compression amount for the left edge; and in the point d image, $\Delta L1$ is the compression amount for the left edge of the object (main subject 202).

$$\Delta R1 > \Delta R2 > \Delta R3$$

$$\Delta L1 > \Delta L2 > \Delta L3$$

Accordingly, in all of the (1) the case where the point a image is the L image, and the point b image is the R image, (2) the case where the point b image is the L image, and the point c image is the R image, and (3) the case where the point c image is the L image, and the point d image is the R image, the disparity at the object edges is lower after the compressing mode processing than before the compressing mode processing.

For example, consider the case of the following.

$$\Delta R1 = 3 \times \Delta R3$$

$$\Delta R2 = 2 \times \Delta R3$$

$$\Delta L1 = 3 \times \Delta L3$$

$$\Delta L2 = 2 \times \Delta L3$$

(1) In the case where the point a image is the L image, and the point b image is the R image, the compression amount for the right edge of the object (main subject 202) is as follows:

$$\Delta R1 - \Delta R2 = \Delta R3$$

and the compression amount for the left edge of the object (main subject 202) is $\Delta L3$.

(2) In the case where the point b image is the L image, and the point c image is the R image, the compression amount for the right edge of the object (main subject 202) is as follows:

$$\Delta R2 - \Delta R3 = \Delta R3$$

and the compression amount for the left edge of the object (main subject 202) is as follows:

$$\Delta L2 - \Delta L3 = \Delta L3$$

(3) In the case where the point c image is the L image, and the point d image is the R image, the compression amount for the right edge of the object (main subject 202) is $\Delta R3$, and the compression amount for the left edge is as follows:

$$\Delta L1 - \Delta L2 = \Delta L3$$

In other words, in all of the (1) the case where the point a image is the L image, and the point b image is the R image, (2) the case where the point b image is the L image, and the point c image is the R image, and (3) the case where the point c image is the L image, and the point d image is the R image, the disparity at the object edges is lower after the compressing mode processing than before the compressing mode processing. Also, in all of the cases, the compression amount for the left edge of the object (main subject 202) is $\Delta L3$, and the compression amount for the right edge is $\Delta R3$.

As described above, by executing processing in the compressing mode on images from four viewpoints, the disparity of the object (main subject 202) existing in front of a virtual screen is lowered, that is to say, the disparity of the three-dimensional image changes toward a distance. For this reason, the vicinity of the contour (left edge portion area and right edge portion area) of the target object (main subject 202) is slightly farther away than the interior (inner area in the image) of the target object (main subject 202). As a result, in the three-dimensional images after the compressing mode processing, a sense of roundness is expressed such that the vicinity of the contour of the target object (main subject 202) curves toward a distance.

When the sense of roundness in the vicinity of the contour is perceived, a three-dimensional object, not a planar object, is recognized by the brain, thus reducing the cardboard effect. Accordingly, performing processing as described above enables acquiring three-dimensional images in which the cardboard effect is reduced.

<<Processing in Stretching Mode in Case of Four Viewpoints>>

Next, processing in the stretching mode in the case of four viewpoints will be described with reference to the drawings.

The following describes the case of executing processing in the stretching mode on images acquired from the four viewpoints in FIG. 16.

FIG. 18 show image signal waveforms of captured images acquired from the four viewpoints a to d in FIG. 16 in the imaging scene 200, where the horizontal axis indicates x coordinates (position coordinates in the x direction) in the captured images, and the vertical axis indicates luminance (corresponding to the pixel values (luminance values) of the pixels of the captured images).

Figures 18A, 18B, 18C, 18D:
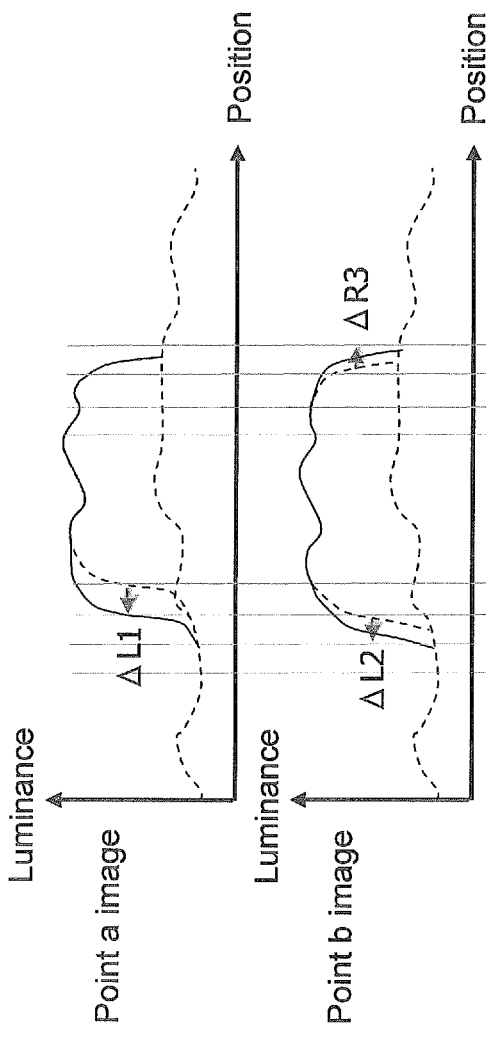
FIG. 18A to 18D are diagrams for illustrating processing in the stretching mode with the case of four viewpoints according to another embodiment.

Also, FIG. 18A shows the image acquired at the viewpoint a, FIG. 18B shows the image acquired at the viewpoint b, FIG. 18C shows the image acquired at the viewpoint c, and FIG. 18D shows the image acquired at the viewpoint d. Also, the x coordinates are drawn so as to match each other in FIG. 18A to D.

Also, in FIG. 18A to D, the dashed lines indicate the image signal waveforms before processing is performed on the captured images acquired at the four viewpoints a to d, and the solid lines indicate the image signal waveforms after processing.

In the processing in the stretching mode in the case of four viewpoints, it is sufficient to set stretch amounts of object edges as shown below. Specifically, as shown in FIG. 18, it is sufficient to execute processing in the stretching mode on the images such that the expressions below are satisfied in the case where: in the point a image, $\Delta L1$ is the stretch amount for the left edge of the object (main subject 202); in the point b image, $\Delta L2$ is the stretch amount for the left edge of the object (main subject 202), and $\Delta R3$ is the stretch amount for the right edge; in the point c image, $\Delta L3$ is the stretch amount for the left edge of the object (main subject 202), and $\Delta R2$ is the stretch amount for the right edge; and in the point d image, $\Delta R1$ is the stretch amount for the right edge of the object (main subject 202).

$$\Delta R1 > \Delta R2 > \Delta R3$$

$$\Delta L1 > \Delta L2 > \Delta L3$$

Accordingly, in all of the (1) the case where the point a image is the L image, and the point b image is the R image, (2) the case where the point b image is the L image, and the point c image is the R image, and (3) the case where the point c image is the L image, and the point d image is the R image, the disparity at the object edges is lower after the stretching mode processing than before the stretching mode processing.

For example, consider the case of the following.

$$\Delta R1 = 3 \times \Delta R3$$

$$\Delta R2 = 2 \times \Delta R3$$

$$\Delta L1 = 3 \times \Delta L3$$

$$\Delta L2 = 2 \times \Delta L3$$

(1) In the case where the point a image is the L image, and the point b image is the R image, the stretch amount for the left edge of the object (main subject 202) is as follows:

$$\Delta L1 - \Delta L2 = \Delta L3$$

and the stretch amount for the right edge of the object (main subject 202) is $\Delta R3$.

(2) In the case where the point b image is the L image, and the point c image is the R image, the stretch amount for the left edge of the object (main subject 202) is as follows:

$$\Delta L2 - \Delta L3 = \Delta L3$$

and the stretch amount for the right edge of the object (main subject 202) is as follows:

$$\Delta R2 - \Delta R3 = \Delta R3$$

(3) In the case where the point c image is the L image, and the point d image is the R image, the stretch amount for the left edge of the object (main subject 202) is $\Delta L3$, and the stretch amount for the right edge is as follows:

$$\Delta R1 - \Delta R2 = \Delta R3$$

In other words, in all of the (1) the case where the point a image is the L image, and the point b image is the R image, (2) the case where the point b image is the L image, and the point c image is the R image, and (3) the case where the point c image is the L image, and the point d image is the R image, the disparity at the object edges is lower after the stretching mode processing than before the stretching mode processing. Also, in all of the cases, the stretch amount for the left edge of the object (main subject 202) is $\Delta L3$, and the stretch amount for the right edge is $\Delta R3$.

As described above, by executing processing in the stretching mode on images from four viewpoints, the disparity of the object (main subject 202) existing in front of a virtual screen is lowered, that is to say, the disparity of the three-dimensional image changes toward a distance. For this reason, the vicinity of the contour (left edge portion area and right edge portion area) of the target object (main subject 202) is slightly farther away than the interior (inner area in the image) of the target object (main subject 202). As a result, in the three-dimensional images after the stretching mode processing, a sense of roundness is expressed such that the vicinity of the contour of the target object (main subject 202) curves toward a distance.

When the sense of roundness in the vicinity of the contour is perceived, a three-dimensional object, not a planar object, is recognized by the brain, thus reducing the cardboard effect. Accordingly, performing processing as described above enables acquiring three-dimensional images in which the cardboard effect is reduced.

Note that the various blocks of the three-dimensional imaging device described in the aforementioned embodiments may be implemented as single individual chips by employing semiconductor devices such as LSIs, or some or all of the blocks may be implemented as a single chip. Note that although the term "LSI" is used here, other names, such as IC, system LSI, super LSI, ultra LSI, and so on are used depending on the degree of integration.

Further, the manner in which the circuit integration is achieved is not limited to LSIs, and it is also possible to use a dedicated circuit or a general purpose processor. FPGAs (Field Programmable Gate Arrays) that can be programmed after the LSI manufacture, reconfigurable processors in which the connections, settings, and so on of circuit cells within the LSIs can be reconfigured, or the like may be used as well.

Furthermore, if other technologies that improve upon or are derived from semiconductor technology enable integration technology to replace LSIs, then naturally it is also possible to integrate the functional blocks using that technology. Biotechnology applications are one such foreseeable example.

Also, some or all of the processing of the functional blocks of the above-described embodiments may be realized by programs. The some or all of the processing of the functional blocks of the above-described embodiments are executed by a central processing unit (CPU) in a computer. Also, the programs for executing the respective processing are stored in a storage device such as a hard disk or a ROM, and are executed in the ROM or read out to a RAM and then executed.

Also, the various processing in the above embodiments may be realized by hardware, or may be realized by software (including the case of being realized together with an OS (operating system), middleware, or a predetermined library). Furthermore, such processing may be realized by a combination of software and hardware. It goes without saying that it is necessary to adjust the timing at which to execute each process in the case where the three-dimensional imaging device according to the above embodiments is implemented through hardware. For simplicity's sake, the descriptions in the above embodiments have omitted the details regarding the adjustment of the timing of the various signals that arises in the actual hardware architecture.

In addition, the order of execution in the processing methods of the aforementioned embodiments is not necessarily limited to the descriptions in the aforementioned embodiments, and the order of execution can be interchanged without departing from the spirit of the invention.

A computer program for causing a computer to execute the above-described method and a computer-readable recording medium recording the program are encompassed in the present invention. Here, examples of the computer-readable recording medium include a flexible disk, a hard disk, a CD-ROM, an MO, a DVD, a DVD-ROM, a DVD-RAM, a BD (Blue-ray Disc), and a semiconductor memory.

The computer program is not limited to being recorded on the recording medium, and may be transmitted via, for example, an electrical communication line, a wireless or wired communication line, or a network typified by the Internet.

Also, the case of acquiring (capturing) stereo images (left-eye images and right-eye images) using two imaging units is described in the above embodiments. However, there is no limitation to this, and for example, left-eye images and right-eye images may be acquired alternately by time division by one imaging element, or left-eye images and right-eye images may be obtained by bisecting the imaging element plane of one imaging element.

Also, although a configuration according to which an R image and an L image are input to the image input unit 102 is described in the above embodiments, there is no limitation to this, and for example, a configuration is possible in which an R image and an L image are selected from among N (N being a natural number greater than or equal to 2) images acquired by a multi-viewpoint system, and the selected R image (signal) and L image (signal) are input to the image input unit 102.

Also, it is not necessarily necessary for the R image and the L image to be internally acquired in the three-dimensional image processing device. For example, the R image and the L image may be input to the three-dimensional image processing device from an external device.

Furthermore, it is not necessarily necessary for R depth information and L depth information to be internally acquired in the three-dimensional image processing device. For example, the R depth information and L depth information may be input to the three-dimensional image processing device from an external device. In this case, the depth acquisition unit 103 can be omitted from the three-dimensional image processing device. In other words, the three-dimensional image processing device may include only the image correction unit 104.

Also, specific configurations of the present invention are not intended to be limited to the above embodiments in any way, and various modifications and variations can be made without deviating from the spirit of the invention.

INDUSTRIAL APPLICABILITY

According to a three-dimensional image processing device, a three-dimensional image processing method, and a program of the present invention, regardless of what factor produced a cardboard effect, it is possible to restore the three-dimensional appearance and sense of thickness of a subject and acquire high-quality three-dimensional images with little of the cardboard effect. The present invention is therefore useful in the fields related to three-dimensional images (three-dimensional video), and can be carried out in such fields.

The invention claimed is:

1. A three-dimensional image processing device for performing image correction processing on a left-eye image and a right-eye image included in a twin-lens or multi-viewpoint three-dimensional image, comprising:
   a depth acquisition unit configured to acquire distance information in a three-dimensional space with respect to a subject included in the left-eye image and the right-eye image; and
   an image correction unit configured to detect an edge portion area of the subject in the left-eye image and the right-eye image based on the distance information on the subject acquired by the depth acquisition unit, and adjust a disparity of the detected edge portion area of the subject in the left-eye image and the right-eye image such that a normal position of the detected edge portion area of the subject is farther away when the three-dimensional image is three-dimensionally displayed.

2. The three-dimensional image processing device according to claim 1,
   wherein the image correction unit includes a left-eye image correction unit and a right-eye image correction unit,
   the left-eye image correction unit detects, as left-eye distance change information, change in a distance between the subject and a background included in the left-eye image based on the distance information acquired by the depth acquisition unit, detects a left edge portion area of the subject in the left-eye image using the left-eye distance change information, and corrects the left-eye image such that the detected left edge portion area of the subject is enlarged in the leftward direction in the left-eye image, and
   the right-eye image correction unit detects, as right-eye distance change information, change in a distance between the subject and the background included in the right-eye distance image based on the distance information acquired by the depth acquisition unit, detects a right edge portion area of the subject in the right-eye image using the right-eye distance change information, and corrects the left-eye image such that the detected right edge portion area of the subject is enlarged in the rightward direction in the right-eye image.

3. The three-dimensional image processing device according to claim 1,
   wherein the image correction unit includes a left-eye image correction unit and a right-eye image correction unit,
   the left-eye image correction unit detects, as left-eye distance change information, change in a distance between the subject and a background included in the left-eye image based on the distance information acquired by the depth acquisition unit, detects a right edge portion area of the subject in the left-eye image using the left-eye distance change information, and corrects the left-eye image such that the detected right edge portion area of the subject is shrunk in the leftward direction in the left-eye image, and
   the right-eye image correction unit detects, as right-eye distance change information, change in a distance between the subject and the background included in the right-eye distance image based on the distance information acquired by the depth acquisition unit, detects a right edge portion area of the subject in the right-eye image using the right-eye distance change information, and corrects the left-eye image such that the detected left edge portion area of the subject is shrunk in the rightward direction in the right-eye image.

4. A three-dimensional image processing device that performs image correction processing on images P(1) to P(N) (a variable x in image P(x) being a natural number assigned in ascending order from left to right) that are N (N being a natural number greater than or equal to 2) images acquired by a multi-viewpoint system, the three-dimensional image processing device comprising:

a depth acquisition unit configured to acquire distance information in a three-dimensional space with respect to a subject included in the image P(k) (1≤k≤N−1, k being a natural number) and the image P(j+1) (k≤j≤N−1, j being a natural number); and an image correction unit configured to detect an edge portion area of the subject in the image P(k) and the image P(j+1) based on the distance information on the subject acquired by the depth acquisition unit, and adjust a disparity of the detected edge portion area of the subject in the image P(k) and the image P(j+1) such that a normal position of the edge portion area of the subject is farther away when the three-dimensional image is three-dimensionally displayed.

5. The three-dimensional image processing device according to claim 4, wherein the image correction unit detects a left edge portion area and a right edge portion area of the subject in the images P(1) to P(N), and in the image P(m) (1≤m≤N, k being a natural number), letting ΔL(m) be a left-hand, with respect to the image, stretch amount of the detected subject, and ΔR(N−m+1) be a right-hand, with respect to the image, stretch amount of the detected subject, for any natural number x satisfying 1≤x≤N−2, using a right-hand stretch amount and a left-hand stretch amount that satisfy $\Delta R(x) > \Delta R(x+1)$ $\Delta L(x) > \Delta L(x+1)$ (1) for the image P(1), the image correction unit corrects the image P(1) such that the left edge portion area of the subject is enlarged in the leftward direction by the stretch amount ΔL(1), (2) for the image P(x) (2≤x≤N−1, x: natural number), the image correction unit corrects the image P(x) such that the left edge portion area of the subject is enlarged in the leftward direction by the stretch amount ΔL(x), and the right edge portion area of the subject is enlarged in the rightward direction by the stretch amount ΔR(N−x+1), and (3) for the image P(N), the image correction unit corrects the image P(N) such that the right edge portion area of the subject is enlarged in the rightward direction by the stretch amount ΔR(1).

6. The three-dimensional image processing device according to claim 4, wherein the image correction unit detects a left edge portion area and a right edge portion area of the subject in the images P(1) to P(N), and in the image P(m) (1≤m≤N, k being a natural number), letting ΔR(m) be a right-hand, with respect to the image, compression amount of the detected subject, and ΔL(N−m+1) be a left-hand, with respect to the image, compression amount of the detected subject, for any natural number x satisfying 1≤x≤N−2, using a right-hand compression amount and a left-hand compression amount that satisfy $\Delta R(x) > \Delta R(x+1)$ $\Delta L(x) > \Delta L(x+1)$ (1) for the image P(1), the image correction unit corrects the image P(1) such that the right edge portion area of the subject is shrunk in the rightward direction by the compression amount ΔR(1), (2) for the image P(x) (2≤x≤N−1, x: natural number), the image correction unit corrects the image P(x) such that the right edge portion area of the subject is shrunk in the rightward direction by the compression amount ΔR(x), and the left edge portion area of the subject is shrunk in the leftward direction by the compression amount ΔL(N−x+1), and (3) for the image P(N), the image correction unit corrects the image P(N) such that the left edge portion area of the subject is shrunk in the leftward direction by the compression amount ΔL(1).

7. A three-dimensional image processing method for performing image correction processing on a left-eye image and a right-eye image included in a twin-lens or multi-viewpoint three-dimensional image, comprising:

a depth acquisition step of acquiring, from the left-eye image and the right-eye image, distance information serving as information regarding a distance of a subject included in the left-eye image and the right-eye image; and an image correction step of detecting an edge portion area of the subject in the left-eye image and the right-eye image based on the distance information on the subject acquired in the depth acquisition step, and adjusting a disparity of the detected edge portion area of the subject in the left-eye image and the right-eye image such that a normal position of the edge portion area of the subject is farther away when the three-dimensional image is three-dimensionally displayed.

* * * * *